nity in New Market"; Business Wire; Dec. 6, 1994.

(12) United States Patent
Podhajsky et al.

(10) Patent No.: US 8,321,308 B2
(45) Date of Patent: Nov. 27, 2012

(54) ARCHITECTURAL DESIGN FOR MANUAL INVOICING APPLICATION SOFTWARE

(75) Inventors: Georg Podhajsky, Philippsburg (DE);
Stefan Franke, Buxtehude (DE);
Andrea Sudbrack, Heidelberg (DE);
Dietmar Nowotny, Dielheim (DE);
Klaus Schlappner, Mannheim (DE);
Thomas Hoffmann, Roemerberg (DE)

(73) Assignee: SAP AG, Walldorf (DE)

( * ) Notice: Subject to any disclaimer, the term of this patent is extended or adjusted under 35 U.S.C. 154(b) by 281 days.

(21) Appl. No.: 12/327,354

(22) Filed: Dec. 3, 2008

(65) Prior Publication Data
US 2010/0138255 A1    Jun. 3, 2010

(51) Int. Cl.
*G07B 17/00*    (2006.01)

(52) U.S. Cl. ............. 705/30; 705/19; 705/7.11; 705/31; 705/34; 705/40; 709/204; 719/317

(58) Field of Classification Search ...................... 705/30
See application file for complete search history.

(56) References Cited

U.S. PATENT DOCUMENTS

| | | |
|---|---|---|
| 4,947,321 A | 8/1990 | Spence et al. |
| 5,550,734 A | 8/1996 | Tarter et al. |
| 5,560,005 A | 9/1996 | Hoover et al. |
| 5,586,312 A | 12/1996 | Johnson et al. |
| 5,632,022 A | 5/1997 | Warren et al. |
| 5,634,127 A | 5/1997 | Cloud et al. |
| 5,680,619 A | 10/1997 | Gudmundson et al. |
| 5,704,044 A | 12/1997 | Tarter et al. |
| 5,768,119 A | 6/1998 | Havekost et al. |
| 5,822,585 A | 10/1998 | Noble et al. |
| 5,832,218 A | 11/1998 | Gibbs et al. |
| 5,848,291 A | 12/1998 | Milne et al. |
| 5,867,495 A | 2/1999 | Elliott et al. |
| 5,881,230 A | 3/1999 | Christensen et al. |
| 5,893,106 A | 4/1999 | Brobst et al. |
| 5,918,219 A | 6/1999 | Isherwood |
| 5,987,247 A | 11/1999 | Lau |
| H1830 H | 1/2000 | Petrimoulx et al. |
| 6,028,997 A | 2/2000 | Leymann et al. |
| 6,049,838 A | 4/2000 | Miller et al. |
| 6,070,197 A | 5/2000 | Cobb et al. |

(Continued)

FOREIGN PATENT DOCUMENTS

WO       00/23874       4/2000

(Continued)

OTHER PUBLICATIONS

Anon,; "Sequenst Corp Bell Atlantic: Bell Atlantic Selects Sequent for Video-on-Demand Program; Sequent Moves to Sieze Opportu- (Continued)

*Primary Examiner* — Ryan Zeender
*Assistant Examiner* — Fateh M Obaid
(74) *Attorney, Agent, or Firm* — Fish & Richardson P.C.

(57) ABSTRACT

Methods, systems, and apparatus, including computer program products, for implementing a software architecture design for a software application implementing manual invoicing. The application is structured as multiple process components interacting with each other through service interfaces, and multiple service operations, each being implemented for a respective process component. The process components include a Customer Invoice Processing process component, a Due Item Processing process component, a Payment Processing process component, an Accounting process component, a Project Processing process component, and a Balance of Foreign Payment Management process component.

19 Claims, 18 Drawing Sheets

U.S. PATENT DOCUMENTS

| | | | |
|---|---|---|---|
| 6,151,582 A | 11/2000 | Huang et al. | |
| 6,167,563 A | 12/2000 | Fontana et al. | |
| 6,167,564 A | 12/2000 | Fontana et al. | |
| 6,177,932 B1 | 1/2001 | Galdes et al. | |
| 6,182,133 B1 | 1/2001 | Horvitz | |
| 6,208,345 B1 | 3/2001 | Sheard et al. | |
| 6,272,672 B1 | 8/2001 | Conway | |
| 6,311,170 B1 | 10/2001 | Embrey | |
| 6,338,097 B1 | 1/2002 | Krenzke et al. | |
| 6,424,991 B1 | 7/2002 | Gish | |
| 6,434,740 B1 | 8/2002 | Monday et al. | |
| 6,442,748 B1 | 8/2002 | Bowman-Amuah | |
| 6,445,782 B1 | 9/2002 | Elfe et al. | |
| 6,446,045 B1 | 9/2002 | Stone et al. | |
| 6,446,092 B1 | 9/2002 | Sutter | |
| 6,473,794 B1 | 10/2002 | Guheen et al. | |
| 6,493,716 B1 | 12/2002 | Azagury et al. | |
| 6,571,220 B1 | 5/2003 | Ogino et al. | |
| 6,594,535 B1 | 7/2003 | Costanza | |
| 6,601,233 B1 | 7/2003 | Underwood | |
| 6,601,234 B1 | 7/2003 | Bowman-Amuah | |
| 6,606,744 B1 | 8/2003 | Mikurak | |
| 6,609,100 B2 | 8/2003 | Smith et al. | |
| 6,671,673 B1 | 12/2003 | Baseman et al. | |
| 6,678,882 B1 | 1/2004 | Hurley et al. | |
| 6,687,734 B1 | 2/2004 | Sellink et al. | |
| 6,691,151 B1 | 2/2004 | Cheyer et al. | |
| 6,721,783 B1 * | 4/2004 | Blossman et al. | 709/206 |
| 6,738,964 B1 | 5/2004 | Zink et al. | |
| 6,747,679 B1 | 6/2004 | Finch et al. | |
| 6,750,885 B1 | 6/2004 | Finch et al. | |
| 6,764,009 B2 | 7/2004 | Melick et al. | |
| 6,789,252 B1 | 9/2004 | Burke et al. | |
| 6,847,854 B2 | 1/2005 | Discenzo | |
| 6,859,931 B1 | 2/2005 | Cheyer et al. | |
| 6,889,197 B2 | 5/2005 | Lidow | |
| 6,889,375 B1 | 5/2005 | Chan et al. | |
| 6,895,438 B1 | 5/2005 | Ulrich | |
| 6,904,399 B2 | 6/2005 | Cooper et al. | |
| 6,907,395 B1 | 6/2005 | Hunt et al. | |
| 6,954,736 B2 | 10/2005 | Menninger et al. | |
| 6,985,939 B2 | 1/2006 | Fletcher et al. | |
| 6,990,466 B1 * | 1/2006 | Hu | 705/35 |
| 7,003,474 B2 | 2/2006 | Lidow | |
| 7,031,998 B2 | 4/2006 | Archbold | |
| 7,043,448 B2 | 5/2006 | Campbell | |
| 7,047,518 B2 | 5/2006 | Little et al. | |
| 7,050,056 B2 | 5/2006 | Meyringer | |
| 7,050,873 B1 | 5/2006 | Discenzo | |
| 7,055,136 B2 | 5/2006 | Dzoba et al. | |
| 7,058,587 B1 | 6/2006 | Horne | |
| 7,069,536 B2 | 6/2006 | Yaung | |
| 7,072,855 B1 | 7/2006 | Godlewski et al. | |
| 7,076,766 B2 | 7/2006 | Wirts et al. | |
| 7,117,447 B2 | 10/2006 | Cobb et al. | |
| 7,120,597 B1 | 10/2006 | Knudtzon et al. | |
| 7,120,896 B2 | 10/2006 | Budhiraja et al. | |
| 7,131,069 B1 | 10/2006 | Rush et al. | |
| 7,155,409 B1 | 12/2006 | Stroh | |
| 7,181,694 B2 | 2/2007 | Reiss et al. | |
| 7,184,964 B2 | 2/2007 | Wang | |
| 7,191,740 B2 | 3/2007 | Baba et al. | |
| 7,194,431 B1 | 3/2007 | Land et al. | |
| 7,197,740 B2 | 3/2007 | Beringer et al. | |
| 7,200,569 B2 | 4/2007 | Gallagher et al. | |
| 7,206,768 B1 | 4/2007 | deGroeve et al. | |
| 7,216,091 B1 * | 5/2007 | Blandina et al. | 705/26 |
| 7,219,107 B2 | 5/2007 | Beringer | |
| 7,222,786 B2 | 5/2007 | Renz et al. | |
| 7,225,240 B1 | 5/2007 | Fox et al. | |
| 7,249,044 B2 | 7/2007 | Kumar et al. | |
| 7,257,254 B2 | 8/2007 | Tunney | |
| 7,283,973 B1 * | 10/2007 | Loghmani et al. | 705/26 |
| 7,293,254 B2 | 11/2007 | Bloesch et al. | |
| 7,299,970 B1 | 11/2007 | Ching | |
| 7,315,830 B1 | 1/2008 | Wirtz et al. | |
| 7,324,966 B2 | 1/2008 | Scheer | |
| 7,353,180 B1 | 4/2008 | Silverstone et al. | |
| 7,356,492 B2 | 4/2008 | Hazi et al. | |
| 7,367,011 B2 | 4/2008 | Ramsey et al. | |
| 7,370,315 B1 | 5/2008 | Lovell et al. | |
| 7,376,601 B1 | 5/2008 | Aldridge | |
| 7,376,604 B1 | 5/2008 | Butcher | |
| 7,376,632 B1 | 5/2008 | Sadek et al. | |
| 7,383,201 B2 | 6/2008 | Matsuzaki et al. | |
| 7,386,833 B2 | 6/2008 | Granny et al. | |
| 7,406,716 B2 | 7/2008 | Kanamori et al. | |
| 7,415,697 B1 | 8/2008 | Houlding | |
| 7,418,409 B1 | 8/2008 | Goel | |
| 7,418,424 B2 | 8/2008 | Martin et al. | |
| 7,448,022 B1 | 11/2008 | Ram et al. | |
| 7,451,432 B2 | 11/2008 | Shukla et al. | |
| 7,461,030 B2 * | 12/2008 | Hibler et al. | 705/67 |
| 7,469,233 B2 * | 12/2008 | Shooks et al. | 705/67 |
| 7,516,088 B2 | 4/2009 | Johnson et al. | |
| 7,523,054 B2 | 4/2009 | Tyson-Quah | |
| 7,529,699 B2 | 5/2009 | Fuse et al. | |
| 7,536,325 B2 | 5/2009 | Randell et al. | |
| 7,536,354 B1 | 5/2009 | deGroeve et al. | |
| 7,546,520 B2 | 6/2009 | Davidson et al. | |
| 7,546,575 B1 | 6/2009 | Dillman et al. | |
| 7,565,640 B2 | 7/2009 | Shukla et al. | |
| 7,624,371 B2 | 11/2009 | Kulkarni et al. | |
| 7,631,291 B2 | 12/2009 | Shukla et al. | |
| 7,640,195 B2 | 12/2009 | Von Zimmermann et al. | |
| 7,640,291 B2 | 12/2009 | Maturana et al. | |
| 7,644,390 B2 | 1/2010 | Khodabandehloo et al. | |
| 7,657,406 B2 | 2/2010 | Tolone et al. | |
| 7,657,445 B1 | 2/2010 | Goux | |
| 7,665,083 B2 | 2/2010 | Demant et al. | |
| 7,668,761 B2 | 2/2010 | Jenkins et al. | |
| 7,672,888 B2 | 3/2010 | Allin et al. | |
| 7,681,176 B2 | 3/2010 | Wills et al. | |
| 7,693,586 B2 | 4/2010 | Dumas et al. | |
| 7,703,073 B2 | 4/2010 | Illowsky et al. | |
| 7,739,160 B1 | 6/2010 | Ryan et al. | |
| 7,742,985 B1 | 6/2010 | Digrigoli et al. | |
| 7,747,980 B2 | 6/2010 | Illowsky et al. | |
| 7,765,156 B2 | 7/2010 | Staniar et al. | |
| 7,765,521 B2 | 7/2010 | Bryant | |
| 7,788,145 B2 | 8/2010 | Wadawadigi et al. | |
| 7,797,698 B2 | 9/2010 | Diament et al. | |
| 7,814,142 B2 | 10/2010 | Mamou et al. | |
| 7,822,682 B2 | 10/2010 | Arnold et al. | |
| 7,835,971 B2 | 11/2010 | Stockton et al. | |
| 7,904,350 B2 | 3/2011 | Ayala et al. | |
| 7,925,985 B2 | 4/2011 | Moore | |
| 2002/0026394 A1 | 2/2002 | Savage et al. | |
| 2002/0042756 A1 | 4/2002 | Kumar et al. | |
| 2002/0049622 A1 | 4/2002 | Lettich et al. | |
| 2002/0073114 A1 | 6/2002 | Nicastro et al. | |
| 2002/0078046 A1 | 6/2002 | Uluakar et al. | |
| 2002/0082892 A1 | 6/2002 | Raffel et al. | |
| 2002/0103660 A1 | 8/2002 | Cramon et al. | |
| 2002/0107826 A1 | 8/2002 | Ramachandran et al. | |
| 2002/0120553 A1 | 8/2002 | Bowman-Amuah | |
| 2002/0133368 A1 | 9/2002 | Strutt et al. | |
| 2002/0138281 A1 | 9/2002 | Cirulli et al. | |
| 2002/0138358 A1 | 9/2002 | Scheer | |
| 2002/0143598 A1 | 10/2002 | Scheer | |
| 2002/0156695 A1 | 10/2002 | Edwards | |
| 2002/0161907 A1 | 10/2002 | Moon | |
| 2002/0184111 A1 | 12/2002 | Swanson | |
| 2002/0188486 A1 | 12/2002 | Gil et al. | |
| 2002/0198798 A1 | 12/2002 | Ludwig et al. | |
| 2002/0198828 A1 | 12/2002 | Ludwig et al. | |
| 2003/0009754 A1 | 1/2003 | Rowley et al. | |
| 2003/0069774 A1 | 4/2003 | Hoffman et al. | |
| 2003/0074271 A1 | 4/2003 | Viswanath et al. | |
| 2003/0074360 A1 | 4/2003 | Chen et al. | |
| 2003/0083762 A1 | 5/2003 | Farrah et al. | |
| 2003/0084127 A1 | 5/2003 | Budhiraja et al. | |
| 2003/0130860 A1 | 7/2003 | Datta et al. | |
| 2003/0182206 A1 | 9/2003 | Hendrix et al. | |
| 2003/0212602 A1 | 11/2003 | Schaller | |
| 2003/0233290 A1 | 12/2003 | Yang et al. | |
| 2004/0015367 A1 | 1/2004 | Nicastro et al. | |

| | | |
|---|---|---|
| 2004/0034578 A1 | 2/2004 | Oney et al. |
| 2004/0111304 A1 | 6/2004 | Meka et al. |
| 2004/0128180 A1 | 7/2004 | Abel et al. |
| 2004/0153359 A1 | 8/2004 | Ho et al. |
| 2004/0158506 A1 | 8/2004 | Wille |
| 2004/0172510 A1 | 9/2004 | Nagashima et al. |
| 2004/0181470 A1 | 9/2004 | Grounds |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1 | 12/2004 | Mitchell et al. |
| 2004/0254866 A1 | 12/2004 | Crumbach et al. |
| 2004/0255152 A1 | 12/2004 | Kanamori et al. |
| 2005/0010501 A1 | 1/2005 | Ward |
| 2005/0033588 A1 | 2/2005 | Ruiz et al. |
| 2005/0044015 A1 | 2/2005 | Bracken et al. |
| 2005/0060235 A2 | 3/2005 | Byrne |
| 2005/0060408 A1 | 3/2005 | McIntyre et al. |
| 2005/0065828 A1 | 3/2005 | Kroswek et al. |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1 | 6/2005 | Hazi et al. |
| 2005/0144125 A1 | 6/2005 | Erbey et al. |
| 2005/0144226 A1 | 6/2005 | Purewal |
| 2005/0160104 A1 | 7/2005 | Meera et al. |
| 2005/0165784 A1 | 7/2005 | Gomez et al. |
| 2005/0177435 A1 | 8/2005 | Lidow |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1 | 9/2005 | Ballow et al. |
| 2005/0216325 A1 | 9/2005 | Ziad et al. |
| 2005/0222896 A1 | 10/2005 | Rhyne et al. |
| 2005/0235020 A1 | 10/2005 | Gabelmann et al. |
| 2005/0240592 A1 | 10/2005 | Mamou et al. |
| 2005/0246250 A1 | 11/2005 | Murray |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0262192 A1 | 11/2005 | Mamou et al. |
| 2005/0284934 A1 | 12/2005 | Ernesti et al. |
| 2005/0288987 A1 | 12/2005 | Sattler et al. |
| 2005/0289020 A1 | 12/2005 | Bruns et al. |
| 2005/0289079 A1 | 12/2005 | Krishan et al. |
| 2006/0004802 A1 | 1/2006 | Phillips et al. |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1 | 4/2006 | Seubert et al. |
| 2006/0085243 A1 | 4/2006 | Cooper et al. |
| 2006/0085294 A1 | 4/2006 | Boerner et al. |
| 2006/0085336 A1 | 4/2006 | Seubert et al. |
| 2006/0089886 A1 | 4/2006 | Wong |
| 2006/0095439 A1 | 5/2006 | Buchmann et al. |
| 2006/0129978 A1 | 6/2006 | Abrari et al. |
| 2006/0143029 A1 | 6/2006 | Akbay et al. |
| 2006/0206352 A1 | 9/2006 | Pulianda |
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | von Helmolt et al. |
| 2007/0129985 A1 | 6/2007 | Helmolt et al. |
| 2007/0150332 A1 | 6/2007 | Grichnik et al. |
| 2007/0150387 A1 | 6/2007 | Seubert et al. |
| 2007/0150855 A1 | 6/2007 | Jeong |
| 2007/0156430 A1 | 7/2007 | Kaetker et al. |
| 2007/0156475 A1 | 7/2007 | Berger et al. |
| 2007/0156476 A1 | 7/2007 | Koegler et al. |
| 2007/0156482 A1 | 7/2007 | Bagheri |
| 2007/0156489 A1 | 7/2007 | Berger et al. |
| 2007/0156493 A1 | 7/2007 | Tebbe et al. |
| 2007/0156499 A1 | 7/2007 | Berger et al. |
| 2007/0156500 A1 | 7/2007 | Merkel et al. |
| 2007/0156538 A1 | 7/2007 | Peter et al. |
| 2007/0156550 A1 | 7/2007 | Der Emde et al. |
| 2007/0156731 A1 | 7/2007 | Ben-Zeev |
| 2007/0162893 A1 | 7/2007 | Kaetker et al. |
| 2007/0168303 A1 | 7/2007 | Kaetker et al. |
| 2007/0174068 A1 | 7/2007 | Alfandary et al. |
| 2007/0174145 A1 | 7/2007 | Hetzer et al. |
| 2007/0174811 A1 | 7/2007 | Kaetker et al. |
| 2007/0186209 A1 | 8/2007 | Kaetker et al. |
| 2007/0197877 A1 | 8/2007 | Decorte et al. |
| 2007/0198391 A1 | 8/2007 | Dreyer et al. |
| 2007/0214065 A1 | 9/2007 | Kahlon et al. |
| 2007/0220046 A1 | 9/2007 | Kaetker et al. |
| 2007/0233541 A1 | 10/2007 | Schorr et al. |
| 2007/0233574 A1 | 10/2007 | Koegler et al. |
| 2007/0233575 A1 | 10/2007 | Berger et al. |
| 2007/0234282 A1 | 10/2007 | Prigge et al. |
| 2007/0239508 A1 | 10/2007 | Fazal et al. |
| 2007/0239569 A1 | 10/2007 | Lucas et al. |
| 2007/0265862 A1 | 11/2007 | Freund et al. |
| 2008/0004929 A9 | 1/2008 | Raffel et al. |
| 2008/0017722 A1 | 1/2008 | Snyder et al. |
| 2008/0027831 A1 | 1/2008 | Gerhardt |
| 2008/0065437 A1 | 3/2008 | Dybvig |
| 2008/0120129 A1 | 5/2008 | Seubert et al. |
| 2008/0147507 A1 | 6/2008 | Langhammer |
| 2008/0162382 A1 | 7/2008 | Clayton et al. |
| 2008/0208707 A1 | 8/2008 | Erbey et al. |
| 2008/0215354 A1 | 9/2008 | Halverson et al. |
| 2009/0037287 A1 | 2/2009 | Baitalmal et al. |
| 2009/0037492 A1 | 2/2009 | Baitalmal et al. |
| 2009/0189743 A1 | 7/2009 | Abraham et al. |
| 2009/0192858 A1 | 7/2009 | Johnson |
| 2010/0070324 A1 | 3/2010 | Bock et al. |
| 2010/0070336 A1 | 3/2010 | Koegler et al. |

FOREIGN PATENT DOCUMENTS

| | | |
|---|---|---|
| WO | WO 2004/083984 | 9/2004 |
| WO | WO 2005/114381 | 12/2005 |

OTHER PUBLICATIONS

Anon.; "State of the Art Reports™ 13,000 MAS 90® for WINDOWS® Shipments in First Nine Months of Availability"; PR Newswire; Apr. 28, 1997.

Avanquest's Bookkeeper 2007 Provides All-in-One Solution for Small Business Accounting and Financial Management; New Version of Popular Software Enables Detailed Report Creation and In-House Payroll Processing; Pr Newswire; New York; Oct. 3, 2006.

Avery, S.; "Buyer's Guide to Software for Purchasing 2000.(Directory)"; Purchasing, vol. 129, No. 1; p. 179; Jul. 13, 2000.

"Hudson's Bay Company Realizes Fast ROI with the Oracle E-Business Suite"; PR Newswire; New York; Jan. 15, 2002; p. 1.

Office Action issued in U.S. Appl. No. 11/397,029; Jul. 21, 2009;28 pages.

Office Action issued in U.S. Appl. No. 11/323,040; Jul. 24, 2009; 35 pages.

Office Action issued in U.S. Appl. No. 11/323,590; Jul. 10, 2009; 32 pages.

Office Action issued in U.S. Appl. No. 11/322,816; Jul. 23, 2006; 41 pages.

Office Action issued in U.S. Appl. No. 11/322,851; Sep. 2, 2009; 32 pages.

Office Action issued in U.S. Appl. No. 11/323,590; Dec. 30, 2009; 31 pages.

Office Action issued in U.S. Appl. No. 11/322,482; Jan. 7, 2010; 19 pages.

Office Action issued in U.S. Appl. No. 11/322,772; Dec. 9, 2009; 14 pages.

Office Action issued in U.S. Appl. No. 11/323,039; Sep. 4, 2009; 36 pages.

Office Action issued in U.S. Appl. No. 11/323,634; Sep. 10, 2009; 15 pages.

Office Action issued in U.S. Appl. No. 11/322,383; Nov. 12, 2009; 29 pages.
Office Action issued in U.S. Appl. No. 11/396,258; Nov. 25, 2009; 9 pages.
Office Action issued in U.S. Appl. No. 12/333,085; Jun. 25, 2009; 9 pages.
Office Action issued in U.S. Appl. No. 11/396,288; Aug. 19, 2009; 20 pages.
Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.
Arch-int, S. et al.; "Development of Industrial Information Systems on the Web Using Busienss Components"; Computers in Industry; vol. 60; 2003; pp. 231-250.
Astudillo, H.; "How Conceptual System Architecture Leads to Business Process"; ACM; 2000; pp. 35-36.
Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.
Cowan, D.D. et al.; "Application Integration: Constructing Composite Applications from Interactive Components"; Software Practice and Experience; vol. 23, No. 3; Mar. 1993; pp. 255-275.
Deimel, A.; "The SAP R/3 Business Framework"; Software—Concepts & Tools; vol. 19, No. 1; 1998; pp. 29-36.
Fellner, K.J., et al.; "Classification Framework for Business Components"; System Sciences; Proceedings of the 33rd Annual Hawaii International Conference; Jan. 2000; pp. 3239-3248.
Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.
Gauthier, P. and OSS-J Architecture Board; "OSS through Java (TM) J2EE Design Guidelines"; [online]; Oct. 31, 2001; http://www.ossj.org/downloads/design_guidelines.shtml.
Gessford, J.E.; "Object-Oriented System Design"; Emerging Information Technologies for Competitive Advantage and Economic Development; Proceedings of the 1992 Information Resources Management Association International Conference; 1992; pp. 110-118.
He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.
Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.
Kythe, D.K.; "The Promise of Distributed Business Components"; Bell Labs Technical Journal; vol. 75, No. 2; Mar./Apr. 1999; pp. 20-28.
Linthicum, D.S.; "Chapter 9: RPCs, Messaging, and B2B Application Integration"; B2B Application Integration: E-Business Enable Your Enterprise; 2001; pp. 167-181.
Nori A.K. et al.; "Composite Applications: Process Based Application Development"; Lecture Notes in Computer Science; vol. 2444; Aug. 2003; pp. 48-53.
Pilhofer, F.; "Writing and Using CORBA Components"; Apr. 2002; http://www.fpx.de/MicoCCM/download/mico-ccm.pdf; 17 pages.
Ravichandran, T.; "Special Issue on Component-Based Software Development"; The Data Base for Advances in Information Systems; 2003; pp. 45-46.
SAP AG; "Designing Cross Solutions"; SAP XAPPS, [online]; Sep. 2003; pp. 1-2; http://www.sap.com/belux/platform/netweaver/pdf/BWP_CAF.pdf.
Schmid, H.A.; "Business Entity Components and Buisness Process Components"; Joop; vol. 12, No. 6; Oct. 1999; pp. 6-10, 12-15.
Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.
Singh, I. et al.; "Designing Enterprise Applications with the J2EE Platform, Second Edition"; Jun. 15, 2002.
Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.
Thomas, A.; "Enterprise JavaBeans Server Component Model for Java"; [online]; Dec. 1997; http://www.cs.indiana.edu/classes/b649-gann/ejb-white-paper.pdf.
Vergil Technology Ltd.; "Vergil Composite Application Builder Suite"; Product Datasheet [online]; 2003; pp. 1-5; http://www.webservicesmall.com.docs/VCAB_datasheet.pdf.
Woods, D.; "Packaged Composite Applications: A Liberating Force for the User Interface"; Internet Citation [online]; Oct. 2004; 4 pages; http://www.sappdesignguild.org/editions/edition7/print_composite_applications.asp.
International Search Report and Written Opinion of the International Searching Authority issued in International Application No. PCT/EP2006/012625; Apr. 3, 2007; 8 pages.
International Preliminary Report on Patentability issued in International Application No. PCT/EP2006/012625; Jul. 1, 2008; 7 pages.
International Search Report and Written Opinion of the International Searching Authority issued in International Application No. PCT/EP2006/012614; Mar. 16, 2007; 7 pages.
International Preliminary Report on Patentability issued in International Application No. PCT/US2006/012614; Jul. 1, 2008; 6 pages.
International Search Report and Written Opinion of the International Searching Authority issued in International Application No. PCT/EP2006/012618; Apr. 3, 2007; 8 pages.
International Preliminary Report on Patentability issued in International Application No. PCT/EP2006/012618; Jul. 1, 2008; 7 pages.
International Search Report and Written Opinion of the International Searching Authority issued in International Application No. PCT/EP2006/012613; May 3, 2007; 6 pages.
International Preliminary Report on Patentability issued in International Application No. PCT/EP2006/012613; Jul. 1, 2008; 6 pages.
International Search Report and Written Opinion of the International Searching Authority issued in International Application No. PCT/EP2006/012624; Mar. 30, 2007; 9 pages.
International Preliminary Report on Patentability issued in International Application No. PCT/EP2006/012624; Jul. 1, 2008; 8 pages.
International Search Report and Written Opinion of the International Searching Authority issued in International Application No. PCT/EP2006/012623; May 7, 2007; 8 pages.
International Preliminary Report on Patentability issued in International Application No. PCT/EP2006/012623; Jul. 1, 2008; 7 pages.
International Search Report and Written Opinion of the International Searching Authority issued in International Application No. PCT/EP2006/012620; Mar. 21, 2007; 7 pages.
International Preliminary Report on Patentability issued in International Application No. PCT/EP2006/012620; Jul. 1, 2008; 6 pages.
International Search Report and Written Opinion of the International Searching Authority issued in International Application No. PCT/EP2006/012619; Apr. 19, 2007; 8 pages.
International Preliminary Report on Patentability issued in International Application No. PCT/EP2006/012619; Jul. 1, 2008; 7 pages.
International Search Report and Written Opinion of the International Searching Authority issued in International Application No. PCT/EP2006/012621; Apr. 19, 2007; 8 pages.
International Preliminary Report on Patentability issued in International Application No. PCT/EP2006/012621; Jul. 1, 2008; 7 pages.
International Search Report and Written Opinion of the International Searching Authority issued in International Application No. PCT/EP2007/002835; Aug. 9, 2007; 12 pages.
International Preliminary Report on Patentability issued in International Application No. PCT/EP2007/002835; Sep. 30, 2008; 8 pages.
Communication Pursuant to Article 94(3) EPC issued in European Application No. 06841224.6; May 15, 2009; 8 pages.
Communication Pursuant to Article 94(3) EPC issued in European Application No. 06847009.5; May 15, 2009; 10 pages.

Communication Pursuant to Article 94(3) EPC issued in European Application No. 07007130.3; Dec. 5, 2008; 6 pages.
Extended European Search Report issued in European Application No. 07007130.3; Oct. 5, 2007; 6 pages.
Office Action issued in U.S. Appl. No. 11/323,041; Apr. 30, 2009; 26 pages.
Office Action issued in U.S. Appl. No. 11/322,612; May 11, 2009; 24 pages.
Office Action issued in U.S. Appl. No. 11/322,772; Mar. 25, 2009; 12 pages.
Office Action issued in U.S. Appl. No. 11/323,590; Jan. 9, 2009; 23 pages.
Office Action issued in U.S. Appl. No. 11/396,288; Jan. 2, 2009; 18 pages.
Office Action issued in U.S. Appl. No. 11/396,288; Apr. 15, 2008; 26 pages.
"American Software Announces ASP Pricing Model for It's a-Applications Expense Business Solution"; PR Newswire; Mar. 6, 2000; 2 pages.
Bastani et al.; "Complex Open System Design by Quasi Agents: Process Oriented Modeling in Agent Based Systems"; ACM SIGSOFT; vol. 34, No. 4; 2009; pp. 1-14.
Bastani et al.; "Process Oriented Abstraction of the Complex Evolvable Systems: Problem Model Construction"; ACM SIGSOFT; vol. 33, No. 3; 2008; pp. 1-13.
"Cendant Announces Comprehensive Online Travel Booking to Meet President Bush's eTravel Initiative"; PR Newswire; Jul. 9, 2002; 3 pages.
Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.
Duc et al.; "Uniform Object Modeling Methodology and Reuse of Real Time System Using UML"; EMSOFT '05; Sep. 19-22, 2005; pp. 44-47.
Gomaa et al.; "Model Based Software Design and Adaption"; International Workshop on Software Engineering for Adaptive and Self-Managing Systems (SEAMS '07); IEEE; 2007; 10 pages.
Huang, S. et al.; "Computer-Assisted Supply Chain Configuration Based on Supply Chain Operations Reference (SCOR) Model"; Computers & Industrial Engineering 48; 2005; pp. 377-394.
Intuit Canada Ltd.; "Startup Guide—QuickBooks Basic for Windows, QuickBooks Pro for Windows, QuickBooks Premier for Windows"; 2002; 230 pages.
Lambert et al.; "Supply Chain Metrics"; International Journal of Logistics Management; vol. 12, No. 1; 2001; pp. 1-19.
Lockamy III, et al.; "Linking SCOR Planning Practices to Supply Chain Performance"; International Journal of Operationgs & Production Management; vol. 24, No. 12; pp. 1192-1218.
mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.
"Oracle Expands E-Commerce Offerings with the Acquisition of E-Travel, Inc."; PR Newswire; Mar. 9, 1999; 3 pages.
Ouyang et al.; "From Business Process Models to Process Oriented Software Systems"; ACM Transactions on Software Engineering and Methodology; vol. 19, No. 1, Article 2; Aug. 2009; pp. 1-37.
Rossi et al.; "Designing and Architecturing Process-aware Web Applications with EPML"; SAC '08; Mar. 16-20, 2008; pp. 2409-2414.
"SAP Delivers Next-generation ERP to Customers"; PR Newswire; New York; Mar. 10, 2005; 7 pages.
Schultz, G.J.; "Keeping SCOR on Your Supply Chain: Basic Operations Reference Model Updates with the Times"; Information Strategy: The Executive's Journal; Summer 2003; pp. 12-20.
Stephens, S.; "Supply Chain Council & Supply Chain Operations Reference (SCOR) Model Overview"; <http://www.supply-chain.org>; Version 5.0a; Aug. 2001; 29 pages.
Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.

"Time Management with mySAP™ ERP Human Capital Management"; Downloaded Mar. 24, 2010 from <http://web.archive.org/web/20060105084834/www.sap.com/solutions/business-suite/erp/hcm/pdf/IICM_Time_Management.pdf>; 4 pages.
Vogel et al.; "mySAP ERP for Dummies"; Published on Sep. 30, 2005; Downloaded on Mar. 23, 2001 from <http://proquest.safaribooksonline.com/9780764599958> 41 pages.
International Search Report and Written Opinion of the International Searching Authority issued in International Application No. PCT/EP2007/002841; Aug. 16, 2007; 12 pages.
International Preliminary Report on Patentability under Chapter I issued in International Application No. PCT/EP2007/002841; Sep. 30, 2008; 8 pages.
Office Action issued in U.S. Appl. No. 11/396,312 on Mar. 30, 2010; 23 pages.
Office Action issued in U.S. Appl. No. 11/322,611 on Mar. 31, 2010; 17 pages.
Notice of Allowance issued in U.S. Appl. No. 11/322,610 on Mar. 1, 2010; 12 pages.
Office Action issued in U.S. Appl. No. 11/322,398 on Apr. 2, 2010; 39 pages.
Office Action issued in U.S. Appl. No. 11/322,383; May 12, 2010; 23 pages.
Office Action issued in U.S. Appl. No. 11/322,382 on Mar. 29, 2010; 28 pages.
Office Action issued in U.S. Appl. No. 11/323,041 on Mar. 19, 2010; 26 pages.
Notice of Allowance issued in U.S. Appl. No. 11/396,259 on Mar. 29, 2010; 19 pages.
Notice of Allowance issued in U.S. Appl. No. 11/396,288; May 20, 2010; 15 pages.
Notice of Allowance issued in U.S. Appl. No. 11/396,258 on Mar. 31, 2010; 9 pages.
Supplemental Notice of Allowance issued in U.S. Appl. No. 11/396,258 on May 19, 2010; 8 pages.
Office Action issued in U.S. Appl. No. 11/396,236 on Mar. 31, 2010; 20 pages.
Office Action issued in U.S. Appl. No. 11/323,039; Apr. 14, 2010; 15 pages.
Office Action issued in U.S. Appl. No. 11/322,851; May 12, 2010; 15 pages.
Office Action issued in U.S. Appl. No. 11/323,040; Apr. 29, 2010; 17 pages.
Office Action issued in U.S. Appl. No. 11/322,612; Apr. 1, 2010; 23 pages.
Notice of Allowance issued in U.S. Appl. No. 11/397,026 on Mar. 29, 2010; 17 pages.
Notice of Allowance issued in U.S. Appl. No. 12/233,554 on May 14, 2010; 11 pages.
Notice of Allowance issued in U.S. Appl. No. 11/967,865 on Mar. 31, 2010; 16 pages.
Office Action issued in U.S. Appl. No. 11/323,634; Apr. 2, 2010; 9 pages.
Office Action issued in U.S. Appl. No. 11/322,816; Apr. 15, 2010; 27 pages.
Office Action issued in U.S. Appl. No. 11/396,327 on Apr. 1, 2010; 26 pages.
Office Action issued in U.S. Appl. No. 12/333,085; Mar. 23, 2010; 5 pages.
Cascallar, Eduardo et al.; "Assessment in the Evaluation of Self-Regulation as a Process"; Educational Psychology Review; vol. 18, No. 3; Sep. 2006; pp. 297-306.
Cool, David W.; "Activity Fund Accounting"; School Business Affairs; vol. 49, No. 6; Jun. 1983; pp. 50-52.
Office Action issued in U.S. Appl. No. 11/396,312 on Sep. 10, 2010; 23 pages.
Office Action issued in U.S. Appl. No. 11/322,611 on Sep. 16, 2010; 21 pages.
Notice of Allowance issued in U.S. Appl. No. 11/322,610 on Jun. 14, 2010; 6 pages.
Office Action issued in U.S. Appl. No. 11/322,772; Jul. 12, 2010; 18 pages.

Notice of Allowance issued in U.S. Appl. No. 11/322,398 on Jul. 23, 2010; 38 pages.
Notice of Allowance issued in U.S. Appl. No. 1/322,382 on Sep. 20, 2010; 6 pages.
Advisory Action issued in U.S. Appl. No. 11/323,041 on Jun. 7, 2010; 3 pages.
Notice of Allowance issued in U.S. Appl. No. 11/396,259 on Jul. 6, 2010; 6 pages.
Notice of Allowance issued in U.S. Appl. No. 11/396,258 on Jul. 28, 2010; 9 pages.
Office Action issued in U.S. Appl. No. 11/322,845; Jul. 15, 2010; 16 pages.
Advisory Action issued in U.S. Appl. No. 11/322,612; Jun. 24, 2010; 3 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 11/968,054 on Sep. 7, 2010; 11 pages.
Office Action issued in U.S. Appl. No. 12/233,557 on Sep. 16, 2010; 16 pages.
Notice of Allowance issued in U.S. Appl. No. 12/233,534 on Jun. 24, 2010; 15 pages.
Notice of Allowance issued in U.S. Appl. No. 11/322,482; Jul. 13, 2010; 5 pages.
Office Action issued in U.S. Appl. No. 11/323,590; Jun. 21, 2010; 25 pages.
Office Action issued in U.S. Appl. No. 11/967,483; Aug. 20, 2010; 10 pages.
Notice of Allowance issued in U.S. Appl. No. 12/333,085; Sep. 13, 2010; 8 pages.
Ferscha et al.; "A Light-Weight Component Model for Peer-to-Peer Applications"; IEEE; Mar. 23, 2004.
Flissi et al.; "A Component-based Software Infrastructure for Ubiquitous Computing"; IEEE; Jul. 4, 2005.
SAP AG; "SAP NetWeaver Visual Composer: User Guide (SAP NetWeaver Visual Composer release 6.0)"; Document version 1.1; pp. 1-208.
Strelich, Thomas P. et al.; "Simulation-Based Transformation with the Service Integration/Interoperation Infrastructure"; Technology Review Journal; Fall/Winter 2005; pp. 99-115.
Notice of Allowance issued in U.S. Appl. No. 11/322,610 on Sep. 23, 2010; 6 pages.
Notice of Allowance issued in U.S. Appl. No. 11/322,610 on Dec. 22, 2010; 6 pages.
Notice of Allowance issued in U.S. Appl. No. 11/322,398 on Oct. 29, 2010; 18 pages.
Notice of Allowanced issued in U.S. Appl. No. 11/322,398 on Nov. 15, 2010; 20 pages.
Notice of Allowance issued in U.S. Appl. No. 11/396,259 on Oct. 15, 2010; 6 pages.
Notice of Allowance issued in U.S. Appl. No. 11/396,288; Dec. 28, 2010; 4 pages.
Notice of Allowance issued in U.S. Appl. No. 11/396,288; Sep. 24, 2010; 4 pages.
Office Action issued in U.S. Appl. No. 11/396,250 on Oct. 18, 2010; 15 pages.
Notice of Allowance issued in U.S. Appl. No. 11/396,258 on Nov. 16, 2010; 8 pages.
Office Action issued in U.S. Appl. No. 11/396,236 on Oct. 28, 2010; 19 pages.
Notice of Allowance issued in U.S. Appl. No. 11/322,845; Dec. 27, 2010; 16 pages.
Office Action issued in U.S. Appl. No. 11/323,040 on Nov. 5, 2010; 33 pages.
Notice of Allowance issued in U.S. Appl. No. 11/397,026 on Nov. 15, 2010; 7 pages.
Notice of Allowance issued in U.S. Appl. No. 12/233,554 on Sep. 17, 2010; 10 pages.
Notice of Allowance issued in U.S. Appl. No. 12/233,534 on Oct. 20, 2010; 15 pages.

Notice of Allowance issued in U.S. Appl. No. 11/967,865 on Oct. 6, 2010; 6 pages.
Office Action issued in U.S. Appl. No. 11/322,973 on Dec. 7, 2010; 13 pages.
Office Action issued in U.S. Appl. No. 11/404,147 on Nov. 24, 2010; 27 pages.
Bin et al.; "Component Model Optimization for Distributed Real-Time Embedded Software"; IEEE International Conference on Systems, Man and Cybernetics; Oct. 13, 2004; 6 pages.
Cox et al.; "A Formal Model for Component Based Software"; IEEE; Aug. 7, 2002; 8 pages.
Gould; "Integrating the Manufacturing Enterprise"; Automative Design & Production; 119, 1; ABI/INFORM Global; Jan. 2007; 3 pages.
Papazoglou et al; "Service-Oriented Computing Research Road Map"; http://infolab.uvt.nl/pub/papazogloump-2006-96.pdf; Mar. 1, 2006; 29 pages.
SAP AG; "Powered by SAP NetWeaver Partner Program—Frequently Asked Questions"; May 2005; 10 pages [online] http://www.lionbridge.com/NR/rdonlyres/4940BE1F/DA46/412E/AB16/F049BD865CA1/0/PBMW FAQ_50070686_en.pdf.
Notice of Allowance issued in U.S. Appl. No. 11/322,610 on Mar. 31, 2011; 6 pages.
Notice of Allowance issued in U.S. Appl. No. 1/322,382 on Jan. 6, 2011; 7 pages.
Notice of Allowance issued in U.S. Appl. No. 11/396,259 on Jan. 20, 2011; 6 pages.
Notice of Allowance issued in U.S. Appl. No. 11/396,250 on Mar. 2, 2011; 13 pages.
Notice of Allowance issued in U.S. Appl. No. 11/322,845; Apr. 8, 2011; 8 pages.
Notice of Allowance issued in U.S. Appl. No. 11/397,026 on Mar. 3, 2011; 6 pages.
Notice of Allowance issued in U.S. Appl. No. 12/233,554 on Feb. 22, 2011; 7 pages.
Office Action issued in U.S. Appl. No. 12/233,550 on Jan. 12, 2011; 29 pages.
Office Action issued in U.S. Appl. No. 12/233,557 on Mar. 4, 2011; 19 pages.
Notice of Allowance issued in U.S. Appl. No. 12/233,534 on Jan. 31, 2011; 15 pages.
Notice of Allowance issued in U.S. Appl. No. 11/396,327 on Nov. 30, 2010; 28 pages
Notice of Allowance issued in U.S. Appl. No. 12/233,462 on Feb. 2, 2011; 11 pages.
Office Action issued in U.S. Appl. No. 11/967, 483 on Mar. 4, 2011; 6 pages.
Office Action issued in U.S. Appl. No. 12/233,417 on Apr. 7, 2011; 32 pages.
Cohen; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Finin et al.; "KQML as an Agent Communication Language"; retrieved on Jul. 26, 2011; pp. 456-463. <http://portal.acm.org/citation.cfm?id=191322>.
Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=repl<ype=pdf>.
Kalakota et al.; "Readings in Electronic Commerce"; Addison-Wesley Longman, Inc.; 1995; ISBN: 0-201-88060-1.
Orsburn; "Spares Management Handbook"; McGrawHill; 1991; ISBN: 0/8306-7626-0.
Notice of Allowance issued in U.S. Appl. No. 12/233,554 on Jun. 27, 2011; 7 pages.
Notice of Allowance issued in U.S. Appl. No. 12/233,550 on May 11, 2011; 20 pages.
Office Action issued in U.S. Appl. No. 12/333,146 on Sep. 6, 2011; 21 pages.

Office Action issued in U.S. Appl. No. 11/323,634 on Apr. 29, 2011; 8 pages.
Office Action issued in U.S. Appl. No. 11/322,973 on May 27, 2011; 15 pages.
Office Action issued in U.S. Appl. No. 11/404,147 on Aug. 4, 2011; 26 pages.
Office Action issued in U.S. Appl. No. 12/332,965 on Oct. 11, 2011; 6 pages.
Notice of Allowance issued in U.S. Appl. No. 12/233,462 on May 18, 2011; 6 pages.
Notice of Allowance issued in U.S. Appl. No. 12/233,462 on Sep. 2, 2011; 7 pages.
Office Action issued in U.S. Appl. No. 12/233,457 on May 26, 2011; 19 pages.
Office Action issued in U.S. Appl. No. 12/327,232 on May 26, 2011; 20 pages.
Office Action issued in U.S. Appl. No. 12/327,590 on Jun. 23, 2011; 16 pages.
Office Action issued in U.S. Appl. No. 12/233,087 on Aug. 18, 2011; 42 pages.
Notice of Allowance issued in U.S. Appl. No. 12/233,534 on May 16, 2011; 12 pages.
Notice of Allowance issued in U.S. Appl. No. 11/322,382 on Jul. 25, 2011; 5 pages.
Notice of Allowanced issued in U.S. Appl. No. 11/322,398 on May 27, 2011; 21 pages.
Office Action issued in U.S. Appl. No. 11/322,383 on May 12, 2010; 23 pages.
Office Action issued in U.S. Appl. No. 11/322,383 on Nov. 12, 2009; 23 pages.
Notice of Allowance issued in U.S. Appl. No. 11/396,259 on Aug. 5, 2011; 7 pages.
Office Action issued in U.S. Appl. No. 11/396,288 on Oct. 17, 2011; 38 pages.
Notice of Allowance issued in U.S. Appl. No. 11/396,250 on Jun. 24, 2011; 5 pages.
Notice of Allowance issued in U.S. Appl. No. 11/396,258 on Jun. 28, 2011; 9 pages.
Notice of Allowance issued in U.S. Appl. No. 11/322,851 on Sep. 2, 2011; 8 pages.
Office Action issued in U.S. Appl. No. 11/323,040 on Jul. 26, 2011; 34 pages.
Notice of Allowance issued in U.S. Appl. No. 11/397,026 on Jul. 20, 2011; 8 pages.
Notice of Allowance issued in U.S. Appl. No. 12/233,417 on Sep. 14, 2011; 11 pages.
Notice of Allowance issued in U.S. Appl. No. 11/968,054 on Aug. 2, 2011; 5 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,458 on Oct. 12, 2011; 19 pages.
Office Action issued in U.S. Appl. No. 11/967,489 on Sep. 28, 2011; 7 pages.
Office Action issued in U.S. Appl. No. 12/233,489 on May 13, 2011; 15 pages.
Office Action issued in U.S. Appl. No. 11/967,393 o n. Apr. 15, 2011; 12 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,865 on Jun. 24, 2011; 8 pages.
Notice of Allowance issued in U.S. Appl. No. 11/967,890 on Jul. 15, 2011; 7 pages.

* cited by examiner

ARCHITECTURAL DESIGN FOR MANUAL INVOICING APPLICATION SOFTWARE

BACKGROUND

The subject matter of this patent application relates to computer software architecture and, more particularly, to the architecture of application software for manual invoicing.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

SUMMARY

This specification presents a software architecture design for a software application implementing manual invoicing.

In its various aspects, the software architecture design can be implemented as methods, systems, and apparatus, including computer program products, for implementing a software architecture design for a software application implementing manual invoicing. The software application is structured as multiple process components interacting with each other through service interfaces, and multiple service operations, each being implemented for a respective process component. The process components include a Customer Invoice Processing process component, a Due Item Processing process component, a Payment Processing Process component, and a Balance of Foreign Payment Management process component.

In its various aspects, the software architecture design can further be implemented as methods, systems, and apparatus, including computer program products, implementing a software architecture design for a software application that is adapted to interact with external software systems through the service operations described in reference to external process components, or a subcombination of them.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

DETAILED DESCRIPTION

Figure 1:
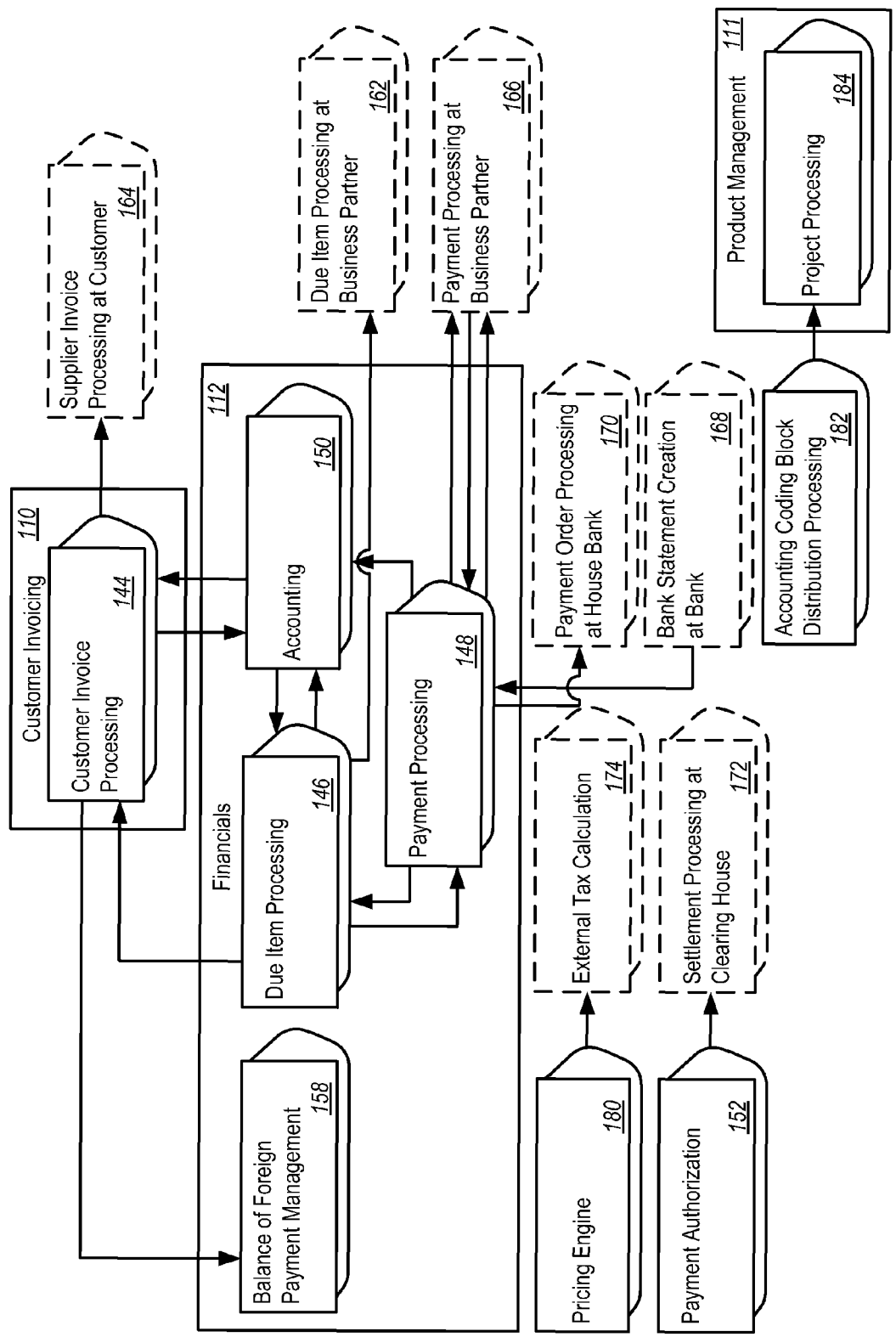
FIG. 1 is a block diagram showing a software architectural design for a manual invoicing software application.

FIG. 1 shows the software architectural design for a manual invoicing software application. The manual invoicing application is software that manages invoices that are created without reference to preceding business transactions (e.g., sales order, service order, service confirmation, and so on) and without goods movement. In some examples, receivables and/or liabilities are managed and payments are monitored. Further, financial accounting is updated throughout the integration scenario.

As shown in FIG. 1, the software architectural design includes a Customer Invoicing deployment unit 110, a Product Management deployment unit 111, and a Financials deployment unit 112. The Customer Invoicing deployment unit 110 includes a Customer Invoice Processing process component 144 that handles invoicing of customers for delivery of goods or provision of services.

The Product Management deployment unit 111 includes a Project Processing process component 184. The Project Processing process component 184 handles the structuring, planning, and execution of simple, short-term measures and complex projects.

The Financials deployment unit 112 includes a Due Item Processing process component 146, a Payment Processing process component 148, an Accounting process component 150, and a Balance of Foreign Payment Management process component 158. The Due Item Processing process component 146 handles the collection, management, and monitoring of trade receivables or payables and corresponding sales tax or withholding tax. The Payment Processing process component 148 handles the processing and management of payments, handles associated communication with financial institutions such as banks, and can provide input for liquidity management. The Accounting process component 150 handles relevant business transactions for valuation and profitability analysis. The Balance of Foreign Payment Management process component 158 handles collection, processing, and reporting of receivables and payables according to foreign trade regulations required by a financial authority of a country, such as a central bank.

The foundation layer, described below, includes a Payment Authorization process component 152, a Pricing Engine process component 180, an Accounting Coding Block Distribution Processing process component 182, and a Project Processing process component 184. The Payment Authorization process component 152 handles the processing of authorization requests for payments made using a payment card. For example, the Payment Authorization process component 152 can authorize a payment for goods or services purchased from an online store using a credit card. The Pricing Engine process component 180 handles processing of price and tax calculations. The Accounting Coding Block Distribution Processing process component 182 handles registration and checking of accounting objects that can be assigned in a source document for a business transaction, such as cost center, projects, or market segment. For example, the Accounting Coding Block Distribution Processing process component 182 can dispatch a check request to the deployment unit of the accounting object.

A number of external process components, described below, will be used to describe the architectural design. These include a Due Item Processing at Business Partner process component 162, a Supplier Invoice Processing at Customer process component 164, a Payment Processing at Business Partner process component 166, a Bank Statement Creation at Bank process component 168, a Payment Order Processing at House Bank process component 170, a Settlement Processing at Clearing House process component 172, and an External Tax Calculation process component 174.

Figure 2:
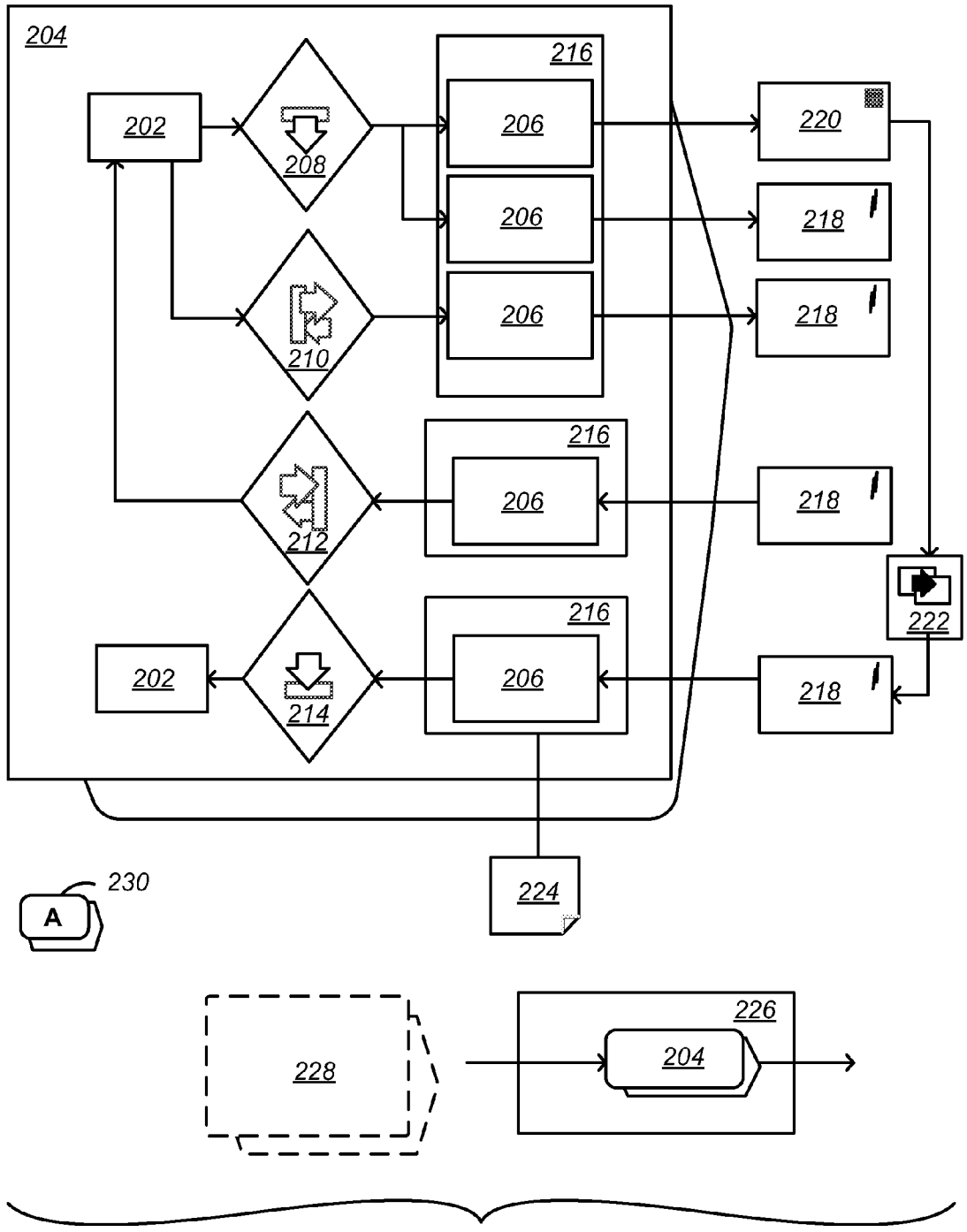
FIG. 2 illustrates the elements of the architecture as they are drawn in the figures.

FIG. 2 illustrates the elements of the architecture as they are drawn in the figures of this patent application. The elements of the architecture include the business object 202, the process component 204, the operation 206, the outbound process agent 208, the synchronous outbound process agent 210, the synchronous inbound process agent 212, the inbound process agent 214, the service interface or interface 216, the message 218, the form message 220, the mapping entity 222, the communication channel template 224, and the deployment unit 226.

Not explicitly represented in the figures is a foundation layer that contains all fundamental entities that are used in multiple deployment units 226. These entities can be process components, business objects and reuse service components. A reuse service component is a piece of software that is reused in different transactions. A reuse service component is used by its defined interfaces, which can be, e.g., local APIs (Application Programming Interfaces) or service interfaces.

A process component of an external system is drawn as a dashed-line process component 228. Such a process component 228 represents the external system in describing interactions with the external system; however, the process component 228 need not represent more of the external system than is needed to produce and receive messages as required by the process component that interacts with the external system.

The connector icon 230 is used to simplify the drawing of interactions between process components 204. Interactions between process component pairs 204 involving their respective business objects 202, process agents (at 208, 210, 212, and 214), operations 206, interfaces 216, and messages (at 218 and 22) are described as process component interactions, which determine the interactions of a pair of process components across a deployment unit boundary, i.e., from one deployment unit 226 to another deployment unit 226. Interactions between process components 204 are indicated in FIG. 1 by directed lines (arrows). Interactions between process components within a deployment unit need not be described except to note that they exist, as these interactions are not constrained by the architectural design and can be implemented in any convenient fashion. Interactions between process components that cross a deployment unit boundary will be illustrated by the figures of this patent application; these figures will show the relevant elements associated with potential interaction between two process components 204, but interfaces 216, process agents (at 208, 210, 212, and 214), and business objects 202 that are not relevant to the potential interaction will not be shown.

The architectural design is a specification of a computer software application, and elements of the architectural design can be implemented to realize a software application that implements the end-to-end process mentioned earlier. The elements of the architecture are at times described in this specification as being contained or included in other elements; for example, a process component 204 is described as being contained in a deployment unit 226. It should be understood, however, that such operational inclusion can be realized in a variety of ways and is not limited to a physical inclusion of the entirety of one element in another.

The architectural elements include the business object 202. A business object 202 is a representation of a type of a uniquely identifiable business entity (an object instance) described by a structural model. Processes operate on business objects. This example business object represents a specific view on some well-defined business content. A business object represents content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component 204, is an object that encapsulates transactional data (i.e., data that is valid for a point in time). The term business object will be used generically to refer to a business process object and a master data object, unless the context requires otherwise. Properly implemented, business objects 202 are implemented free of redundancies.

The architectural elements also include the process component 204. A process component 204 is a software package that realizes a business process and generally exposes its functionality as services. The functionality includes the ability to perform all or parts of particular kinds of business transactions. A process component 204 contains one or more semantically related business objects 202. Any business object belongs to no more than one process component. Process components can be categorized as a standard process component, a process component at a business partner, a third party process component, or a user centric process component. The standard process component (named simply process component) is a software package that realizes a business process and exposes its functionality as services. The process component at a business partner is a placeholder for a process component (or other technology that performs the essential functions of the process component) used at a business partner. The third party process component is a process component (or other technology that performs the essential functions of the process component) provided by a third party. The user centric process component is a process component containing user interface parts.

Process components 204 are modular and context-independent. That they are context-independent means that a process component 204 is not specific to any specific application and is reusable. The process component 204 is often the smallest (most granular) element of reuse in the architecture.

The architectural elements also include the operation 206. An operation 206 belongs to exactly one process component 204. A process component 204 generally is able to perform multiple operations 206. Operations 206 can be synchronous or asynchronous, corresponding to synchronous or asynchronous process agents (e.g. at 208, 210, 212, and 214), which will be described below. Operation 206 may be the smallest, separately-callable function, described by a set of data types used as input, output, and fault parameters serving as a signature.

The architectural elements also include the service interface 216, referred to simply as the interface. An interface 216 is a named group of operations 206. Interface 216 typically specifies inbound service interface functionality or outbound service interface functionality. Each operation 206 belongs to exactly one interface 216. An interface 216 belongs to exactly one process component 204. A process component 204 might contain multiple interfaces 216. In some implementations, an interface contains only inbound or outbound operations, but not a mixture of both. One interface can contain both synchronous and asynchronous operations. All operations of the same type (either inbound or outbound) which belong to the same message choreography will belong to the same interface. Thus, generally, all outbound operations 206 directed to the same other process component 204 are in one interface 216.

The architectural elements also include the message 218. Operations 206 transmit and receive messages 218. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component. In some implementations, the message is a form based message 220 that can be translated into a recognized format for an external process component 228. The form message type 220 is a message type used for documents structured in forms. The form message type 220 can be used for printing, faxing, emailing, or other events using documents structured in forms. In some implementations, the form message type 220 provides an extended signature relative to the normal message type. For example, the form message type 220 can include text information in addition to identification information to improve human reading.

The architectural elements also include the process agent (e.g. at 208, 210, 212, and 214). Process agents do business processing that involves the sending or receiving of messages 218. Each operation 206 will generally have at least one associated process agent. The process agent can be associated with one or more operations 206. Process agents (at 208, 210, 212, and 214) can be either inbound or outbound, and either synchronous or asynchronous.

Asynchronous outbound process agents 208 are called after a business object 202 changes, e.g., after a create, update, or delete of a business object instance. Synchronous outbound process agents 210 are generally triggered directly by a business object 202.

An outbound process agent (208 and 210) will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents (212 and 214) are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents (210 and 212) are used when a process component requires a more or less immediate response from another process component, and is waiting for that response to continue its work.

Operations and process components are described in this specification in terms of process agents. However, in alternative implementations, process components and operations can be implemented without use of agents by using other conventional techniques to perform the functions described in this specification.

The architectural elements also include the communication channel template. The communication channel template is a modeling entity that represents a set of technical settings used for communication. The technical settings can include details for inbound or outbound processing of a message. The details can be defined in the communication channel template. In particular, the communication channel template defines an adapter type, a transport protocol, and a message protocol. In some implementations, various other parameters may be defined based on a selected adapter type. For example, the communication channel template can define a security level, conversion parameters, default exchange infrastructure parameters, processing parameters, download URI parameters, and specific message properties.

The communication channel template 224 can interact with internal or external process components (at 204 and 228). To interact with an internal process component, the communication channel template is received and uploaded to be used with an operation and interface pair. To interact with an external process component, the communication channel template is received and uploaded to be used with an external entity, such as an external bank, business partner, or supplier.

The architectural elements also include the deployment unit 226. A deployment unit 226 includes one or more process components 204 that are deployed together on a single computer system platform. Conversely, separate deployment units can be deployed on separate physical computing systems. For this reason, a boundary of a deployment unit 226 defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components 204 of one instance of one deployment unit 226.

The process components 204 of one deployment unit 226 interact with those of another deployment unit 226 using messages 218 passed through one or more data communication networks or other suitable communication channels. Thus, a deployment unit 226 deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units 226 is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interaction within other deployment units. Similarly, process components 204 that interact with other process components 204 or external systems only through messages 218, e.g., as sent and received by operations 206, can also be replaced as long as the replacement supports the operations 206 of the original 204.

In contrast to a deployment unit 226, the foundation layer does not define a limit for application-defined transactions. Deployment units 226 communicate directly with entities in the foundation layer, which communication is typically not message based. The foundation layer is active in every system instance on which the application is deployed. Business objects 202 in the foundation layer will generally be master data objects. In addition, the foundation layer will include some business process objects that are used by multiple deployment units 226. Master data objects and business process objects that should be specific to a deployment unit 226 are assigned to their respective deployment unit 226.

Interactions between Process Components "Due Item Processing" and "Due Item Processing at Business Partner"

Figure 3:
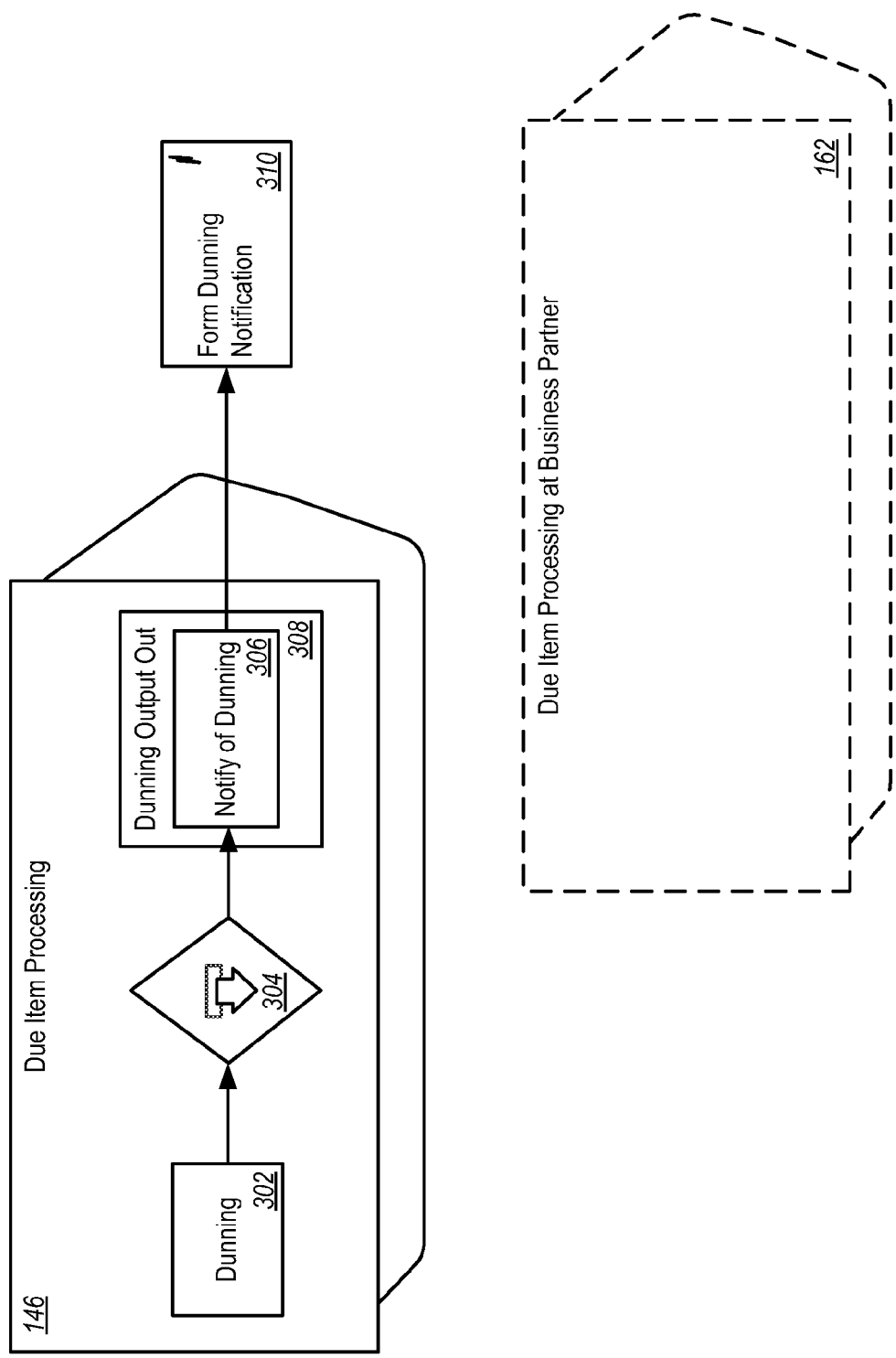
FIG. 3 is a block diagram showing interactions between a Due Item Processing process component and a Due Item Processing at Business Partner process component.

FIG. 3 is a block diagram showing interactions between the Due Item Processing process component 146 and the Due Item Processing at Business Partner process component 162 in the architectural design of FIG. 1. The Due Item Processing process component 146 can notify the Due Item Processing at Business Partner process component 162 about outstanding receivables and expected payments when a dunning is released.

As shown in FIG. 3, the Due Item Processing process component 146 includes a Dunning business object 302. The Dunning business object 302 represents a reminder or demand from a company (e.g., a creditor) to a business partner (e.g., a debtor) to make a payment by a certain point in time. The Dunning business object 302 uses a Notify Of Dunning to Business Partner outbound process agent 304 to send a dunning letter or a payment reminder to the business partner. The Notify Of Dunning to Business Partner outbound process agent 304 invokes a Notify of Dunning operation 306 in a Dunning Output Out interface 308. For example, the operation 306 notifies a business partner about outstanding payments. The Notify of Dunning operation 306 sends a Form Dunning Notification message 310 to the Due Item Processing at Business Partner process component 162.

Interactions between Process Components "Payment Processing" and "Due Item Processing"

Figure 4A:
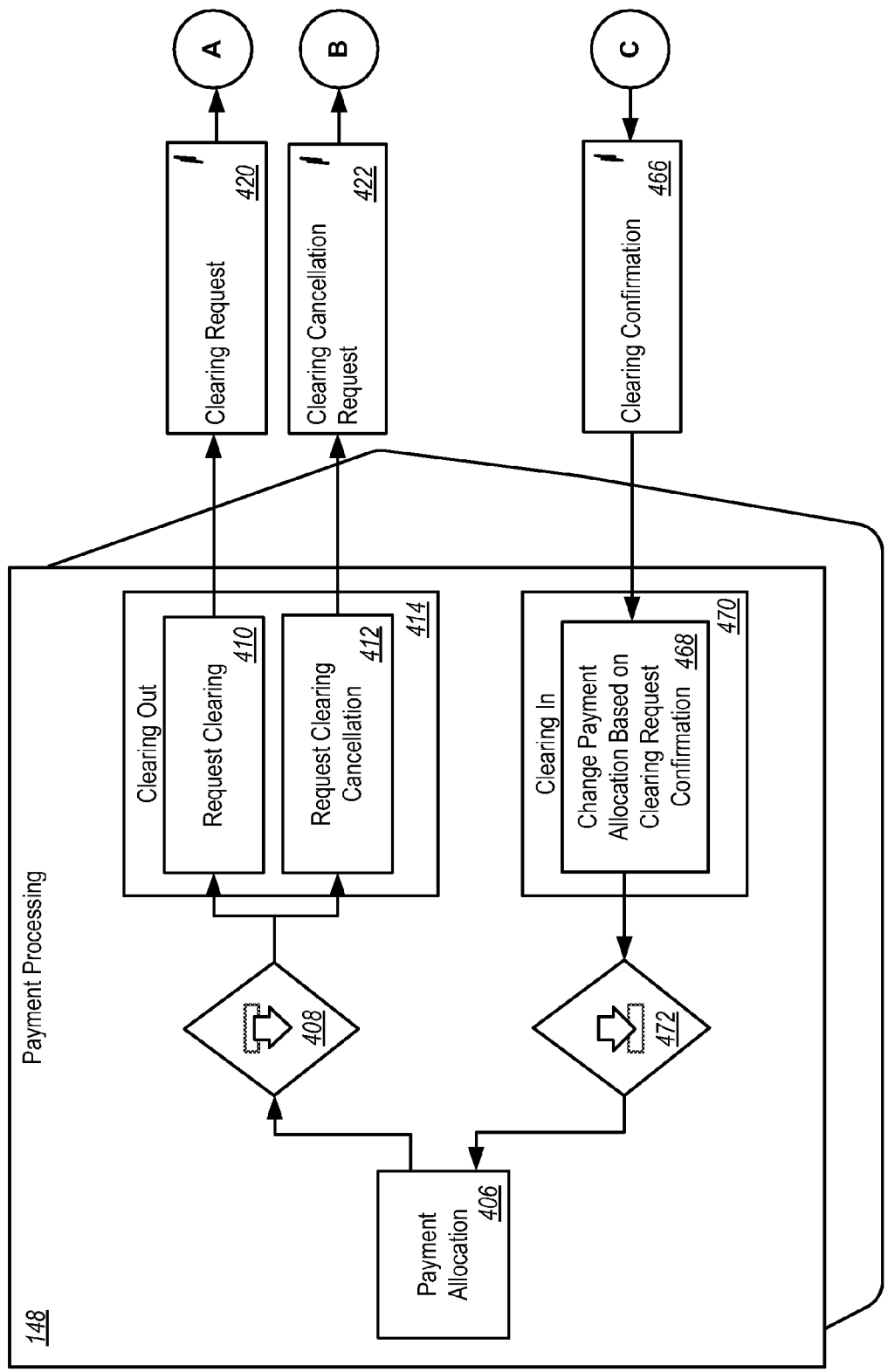
FIGS. 4A and 4B are block diagrams collectively showing interactions between a Payment Processing process component and the Due Item Processing process component.
Figure 4B:
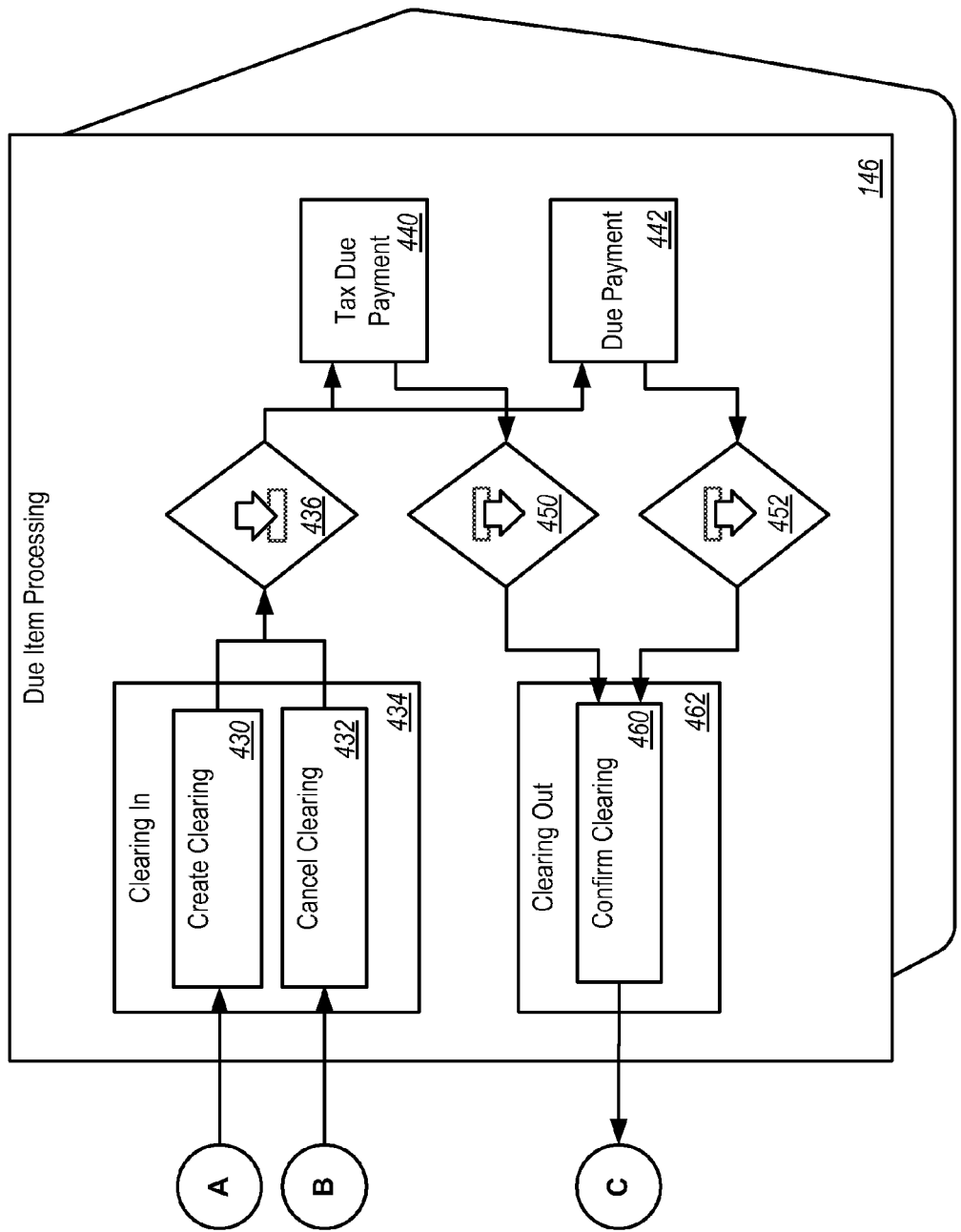

FIGS. 4A and 4B are block diagrams collectively showing interactions between the Payment Processing process component 148 and the Due Item Processing process component 146 in the architectural design of FIG. 1. The Payment Processing process component 148 requests the clearing or the cancellation of the clearing of a payment as well as information about the clearing result from the Due Item Processing process component 146.

As shown in FIG. 4A, the Payment Processing process component 148 includes a Payment Allocation business object 406. The Payment Allocation business object 406 represents an assignment of a payment item to the payment reasons from which the payment item originated. The Payment Allocation business object 406 uses a Request Clearing Maintenance from Payment Allocation to Due Item Processing outbound process agent 408 to invoke one or more operations including a Request Clearing operation 410 and a Request Clearing Cancellation operation 412. The operations 410 and 412 are included in a Clearing Out interface 414. The Request Clearing operation 410 requests the clearing of payments within the Due Item Processing process component 146. The Request Clearing Cancellation operation 412 cancels a previously sent clearing request.

If the Request Clearing operation 410 is invoked, the operation 410 generates a Clearing Request message 420. If the Request Clearing Cancellation operation 412 is invoked, the operation 412 generates a Clearing Cancellation Request message 422.

As shown in FIG. 4B, a Create Clearing operation 430 receives the Clearing Request message 420 and a Cancel Clearing operation 432 receives the Clearing Cancellation Request message 422. The Create Clearing operation 430 creates a clearing for business partner-initiated payments. The Cancel Clearing operation 432 cancels a previously sent clearing request by reference. The operations 430 and 432 are included in a Clearing In interface 434.

The Create Clearing operation 430 and/or the Cancel Clearing operation 432 uses a Maintain Clearing inbound process agent 436 to create clearings or to cancel previously sent clearings for payments, for example, incoming payments for receivables. The inbound process agent 436 updates a Tax Due Payment business object 440 and a Due Payment business object 442. The Tax Due Payment business object 440 represents a payment request or payment confirmation with regard to tax payables and receivables. The Due Payment business object 442 represents a payment request or a payment confirmation for trade receivables and payables.

The Tax Due Payment business object 440 uses a Confirm Clearing from Tax Due Payment to Payment Processing outbound process agent 450 and the Due Payment business object 442 uses a Confirm Clearing from Due Payment to Payment Processing outbound process agent 452 to invoke a Confirm Clearing operation 460. The Confirm Clearing operation 460 sends a confirmation or rejection to the Payment Processing process component 148 for a clearing request. The operation 460 is included in a Clearing Out interface 462.

As shown in FIG. 4A, a Clearing Confirmation message 466 generated by the Confirm Clearing Operation 460 is received in a Change Payment Allocation Based on Clearing Request Confirmation operation 468. The operation 468 confirms the execution or rejection of a sent clearing request. The operation 468 is included in a Clearing In interface 470. The Change Payment Allocation Based on Clearing Request Confirmation operation 468 uses a Change Payment Allocation Based on Clearing Request Confirmation inbound process agent 472 to update the Payment Allocation business object 406.

Interactions between Process Components "Customer Invoice Processing" and "Accounting"

Figure 5:
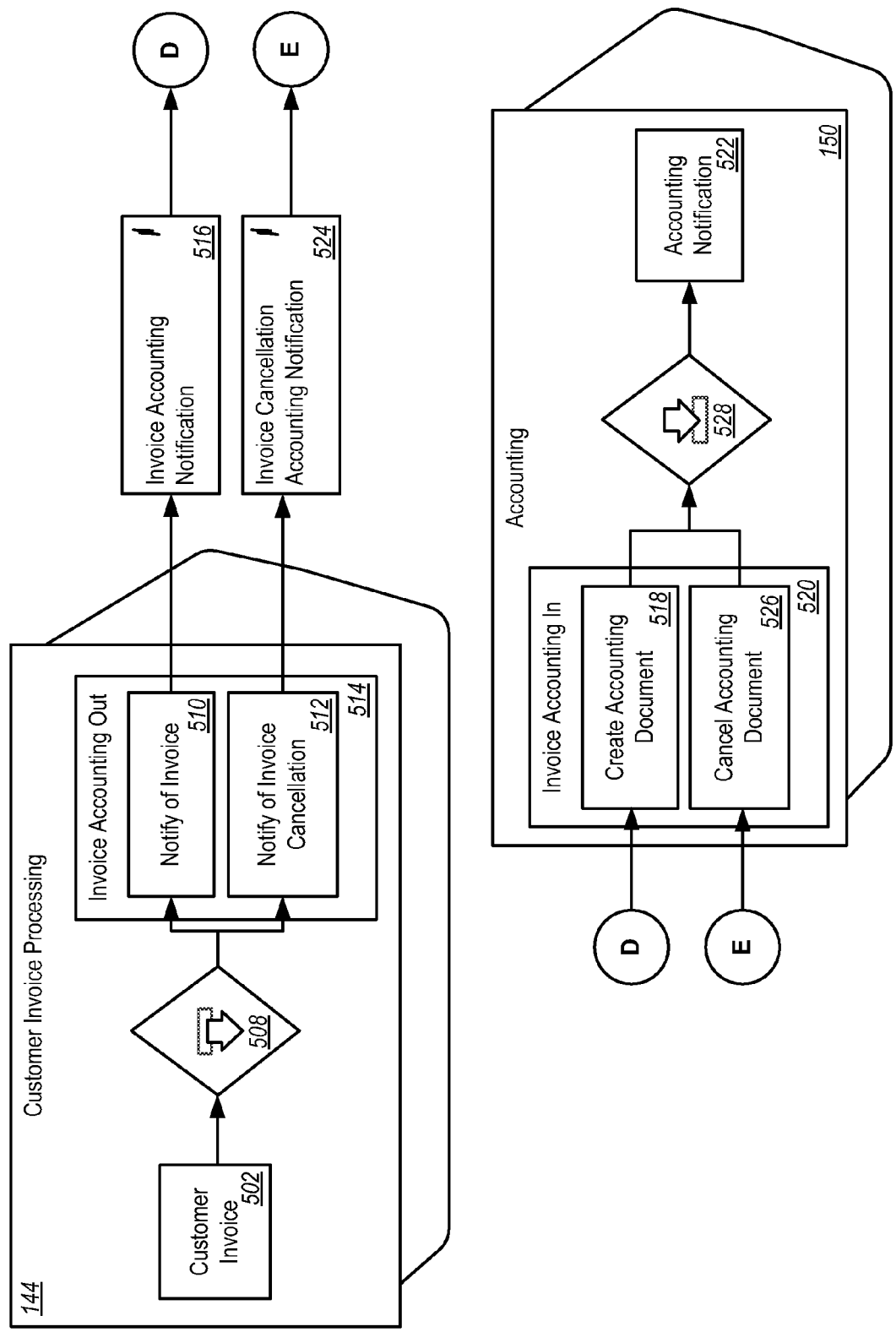
FIG. 5 is a block diagram showing interactions between a Customer Invoice Processing process component and an Accounting process component.

FIG. 5 is a block diagram showing interactions between the Customer Invoice Processing process component 144 and the Accounting process component 150 in the architectural design of FIG. 1. The Customer Invoice Processing process component 144 requests the creation or cancellation of accounting documents from the Accounting process component 150.

As shown in FIG. 5, the Customer Invoice Processing process component 144 includes a Customer Invoice business object 502. The Customer Invoice business object 502 represents a binding statement of amounts receivable resulting, for example, from deliveries to a customer, services performed for a customer, adjustments to these receivables, or credit memos to a customer.

The Customer Invoice business object 502 uses a Notify of Customer Invoice to Accounting outbound process agent 508 to invoke a Notify of Invoice operation 510 or a Notify of Invoice Cancellation operation 512. The Notify of Invoice operation 510 informs accounting about the creation of invoices or credit memos. The Notify of Invoice Cancellation operation 512 informs accounting about the cancellation of invoices or credit memos. The operations 510 and 512 are included in an Invoice Accounting Out interface 514.

The Notify of Invoice operation 510 generates an Invoice Accounting Notification message 516. A Create Accounting Document operation 518 receives the message 516. The Create Accounting Document operation 518 creates an accounting document based on invoice data received from the Customer Invoice Processing process component 144. For example, the received data can be first converted into an accounting notification from which one or more accounting documents are created according to the relevant sets of books. The Create Accounting Document operation 518 is included in an Invoice Accounting In interface 520. The operation 518 uses a Maintain Accounting Document Based on Invoice inbound process agent 528 to update an Accounting Notification business object 522. The Accounting Notification business object 522 represents a notification sent to accounting by an operational component regarding a business transaction; it can represent this operational business transaction, for example, in a standardized form for business transaction documents and can contain the data needed to valuate the business transaction.

The Notify of Invoice Cancellation operation 512 generates an Invoice Cancellation Accounting Notification message 524. A Cancel Accounting Document operation 526, in the Invoice Accounting In interface 520, receives the Invoice Cancellation Accounting Notification message 524 from the Customer Invoice Processing process component 144. The Cancel Accounting Document operation 526 cancels an existing accounting document based on cancellation data received from the Customer Invoice Processing process component 144. For example, the received data can be converted into an accounting notification from which one or more reversal accounting documents are created according to a relevant sets of books. The operation 526 uses the Maintain Accounting Document Based on Invoice inbound process agent 528 to update the Accounting Notification business object 522.

Interactions between Process Components "Customer Invoice Processing" and "Accounting"

Figure 6:
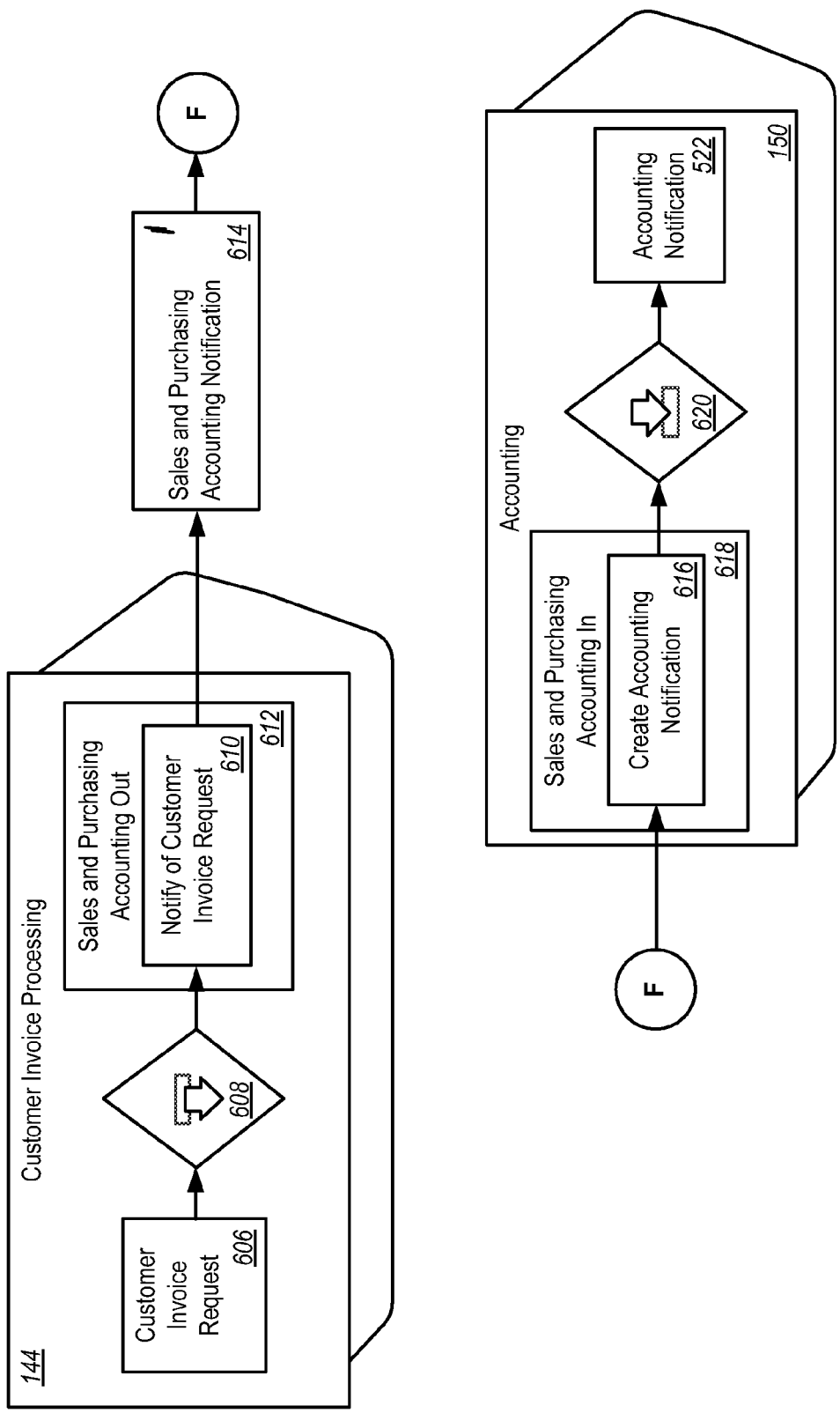
FIG. 6 is a block diagram showing further interactions between the Customer Invoice Processing process component and the Accounting process component.

FIG. 6 is a block diagram showing further interactions between the Customer Invoice Processing process component 144 and the Accounting process component 150 in the architectural design of FIG. 1. The interactions include the requesting of an accounting notification from the Accounting process component 150.

As shown in FIG. 6, the Customer Invoice Processing process component 144 includes a Customer Invoice Request business object 606. The Customer Invoice Request business object 606 represents a request to create one or several customer invoices, or to take account of the data for the underlying business document when creating a customer invoice. The Customer Invoice Request business object 606 uses a Notify of Customer Invoice Request to Accounting outbound process agent 608 to invoke a Notify of Customer Invoice Request operation 610. The operation 610 notifies accounting about the creation, change, or cancellation of a customer invoice request. The Notify of Customer Invoice Request operation 610 is included in a Sales and Purchasing Accounting Out interface 612. The Notify of Customer Invoice Request operation 610 sends a Sales and Purchasing Accounting Notification message 614 to the Accounting process component 150.

A Create Accounting Notification operation 616 receives the Sales and Purchasing Accounting Notification message 614. The operation 616 is included in a Sales And Purchasing Accounting In interface 618. The operation 616 creates an accounting notification based on order data received from customer complaint processing, purchase order processing, sales order processing, service confirmation processing, service order processing, service request processing, or goods and service acknowledgement, to name a few examples.

The Create Accounting Notification operation 616 uses a Maintain Subledger Account based on Sales and Purchasing inbound process agent 620 to update the Accounting Notification business object 522. The Accounting Notification business object 522 represents a notification sent to accounting by an operational component regarding a business transaction.

Interactions between Process Components "Accounting Coding Block Distribution" and "Project Processing"

Figure 7:
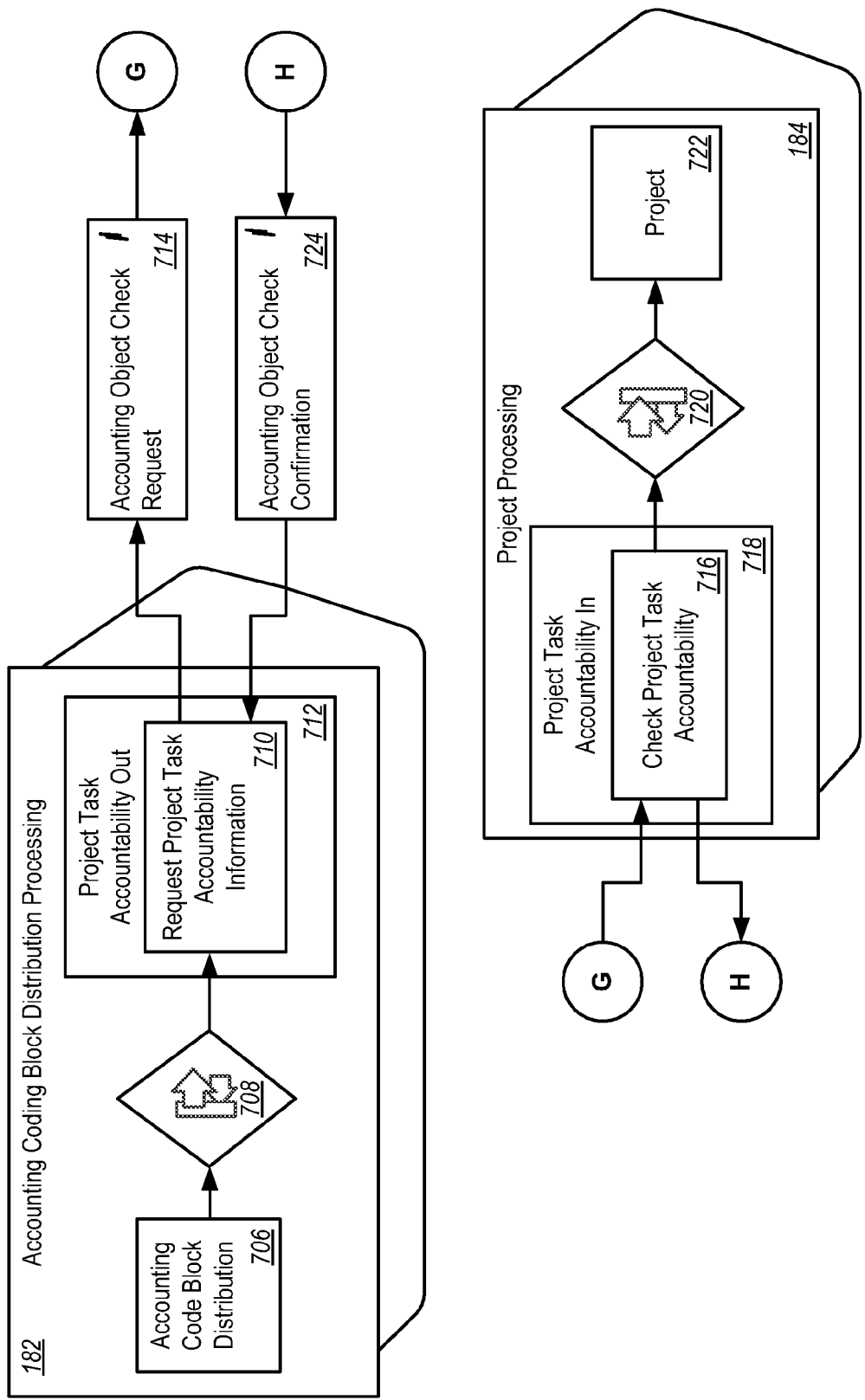
FIG. 7 is a block diagram showing interactions between an Accounting Coding Block Distribution Processing process component and a Project Processing process component.

FIG. 7 is a block diagram showing interactions between the Accounting Coding Block Distribution Processing process component 182 and the Project Processing process component 184 in the architectural design of FIG. 1. The interactions include the reading of project task accountability information.

As shown in FIG. 7, the Accounting Coding Block Distribution Processing process component 182 includes an Accounting Code Block Distribution business object 706. The Accounting Code Block Distribution business object 706 represents the distribution of coding blocks to enterprise resources changes, such as expenses or material movements. A coding block is a set of accounting objects to which an enterprise resource change is assigned. The resource change can be valued in Accounting. The Accounting Code Block Distribution business object 706 uses a Sync Request Project Task Accountability from ACBD to Project Processing synchronous outbound process agent 708 to invoke a Request Project Task Accountability Information operation 710. The operation 710 checks the given tasks for existence and availability for expense or resource assignment in accounting. The Request Project Task Accountability Information operation 710 is included in a Project Task Accountability Out interface 712. The Request Project Task Accountability Information operation 710 sends an Accounting Object Check Request message 714 to the Project Processing process component 184.

A Check Project Task Accountability operation 716 receives the Accounting Object Check Request message 714. The operation 716 is included in a Project Task Accountability In interface 718. The operation 716 checks whether a task can be posted for accounting.

The Check Project Task Accountability operation 716 uses a Sync Check Project Task Accountability synchronous inbound process agent 720 to check whether a project is available for accounting-relevant transactions and to update a Project business object 722. The project business object 722 represents a business undertaking with a goal that is to be attained in a time frame, using funds and resources while reaching a quality level.

The Check Project Task Accountability operation 716 sends an Accounting Object Check Confirmation message 724 to the Accounting Coding Block Distribution Processing process component 182. The message 724 represents a confirmation about the existence of one or more accounting objects and whether they are permitted for assignment. The Request Project Task Accountability Information operation 710 receives the Accounting Object Check Confirmation message 724.

Interactions between Process Components "Payment Authorization" and "Settlement Processing at Clearing House"

Figure 8:
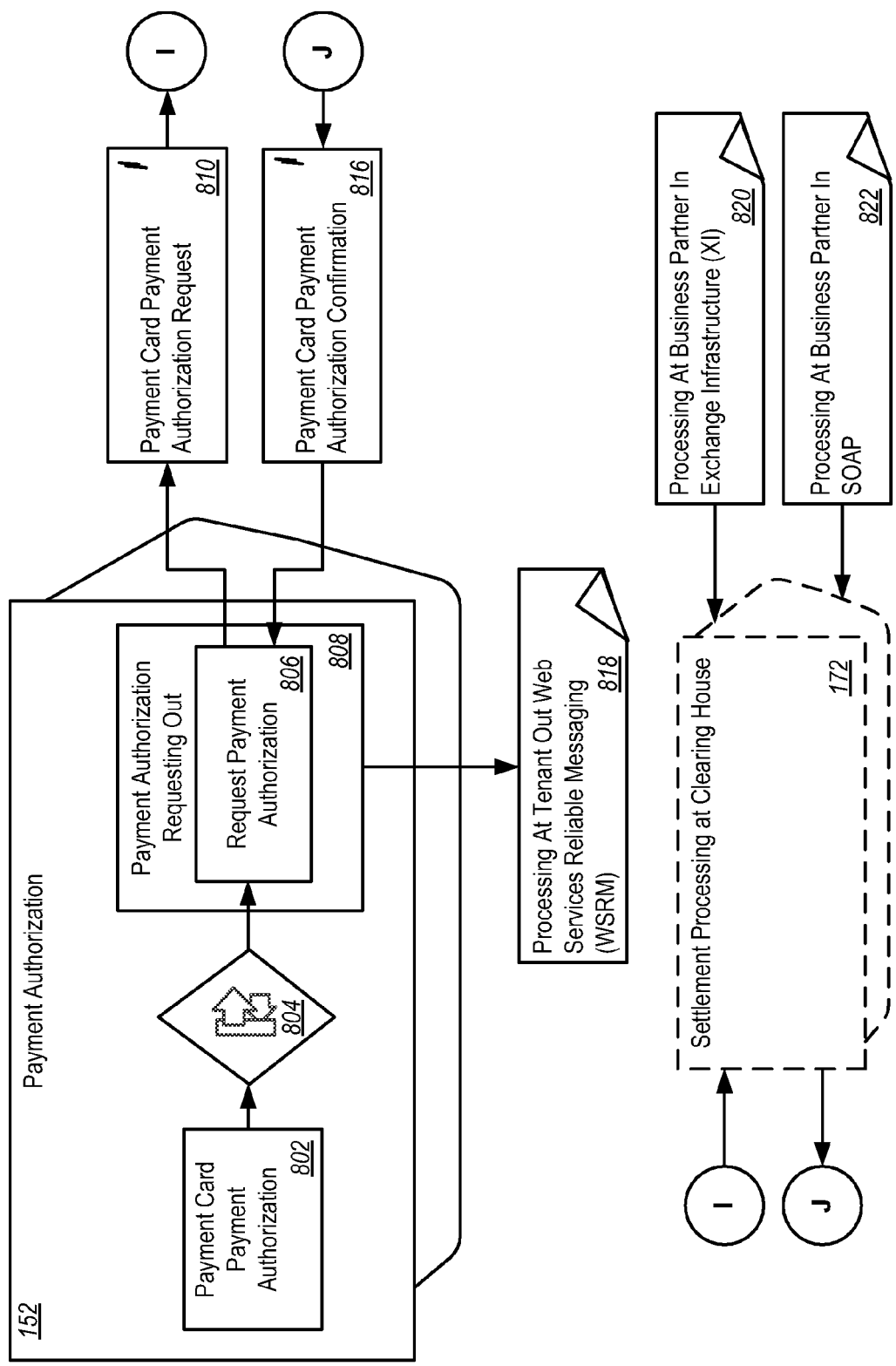
FIG. 8 is a block diagram showing interactions between a Payment Authorization process component and a Settlement Processing at Clearing House process component.

FIG. 8 is a block diagram showing interactions between the Payment Authorization process component 152 and the Settlement Processing at Clearing House process component 172 in the architectural design of FIG. 1. The interactions include the requesting of payment authorization from the Settlement Processing at Clearing House process component 172.

The Payment Authorization process component 152 includes a Payment Card Payment Authorization business object 802. The Payment Card Payment Authorization business object 802 represents an authorization for a payment made using a payment card. For example, the Payment Card Payment Authorization business object 802 can contain payment information including a description of the goods/services purchased, an authorization request, and a result of the authorization request based on a response from the clearing house.

The Payment Card Payment Authorization business object 802 uses a Request Payment Card Payment Authorization synchronous outbound process agent 804 to invoke a Request Payment Authorization operation 806. The Request Payment Authorization operation 806 is included in a Payment Authorization Requesting Out interface 808.

The Request Payment Authorization operation 806 requests a clearing house for authorization of a payment made by a payment card. In this example, the Request Payment Authorization operation 806 sends a Payment Card Payment Authorization Request message 810 to the Settlement Processing at Clearing House process component 172. The Request Payment Authorization operation 806 receives a Payment Card Payment Authorization Confirmation message 816 from the Settlement Processing at Clearing House process component 172 indicating the success or failure of payment authorization.

The Payment Authorization Process component 152 receives information from a Processing Tenant Out Web Services Reliable Messaging (WSRM) communication channel template 818. The Payment Authorization Requesting Out interface 808 sends information to the Settlement Processing at Clearing House process component 172 using the Processing Tenant Out Web Services Reliable Messaging (WSRM) communication channel template 818. The communication channel template 818 can define protocols and parameters used for communication with an external party.

The Settlement Processing at Clearing House process component 172 receives information from the Payment Authorization process component 152 using a Processing At Business Partner In Exchange Infrastructure (XI) communication channel template 820 and/or a Processing At Business Partner In SOAP communication channel template 822. The communication channel templates 820 and 822 can define protocols and parameters used for communication with an external party.

Interactions between Process Components "Bank Statement Creation at Bank" and "Payment Processing"

Figure 9:
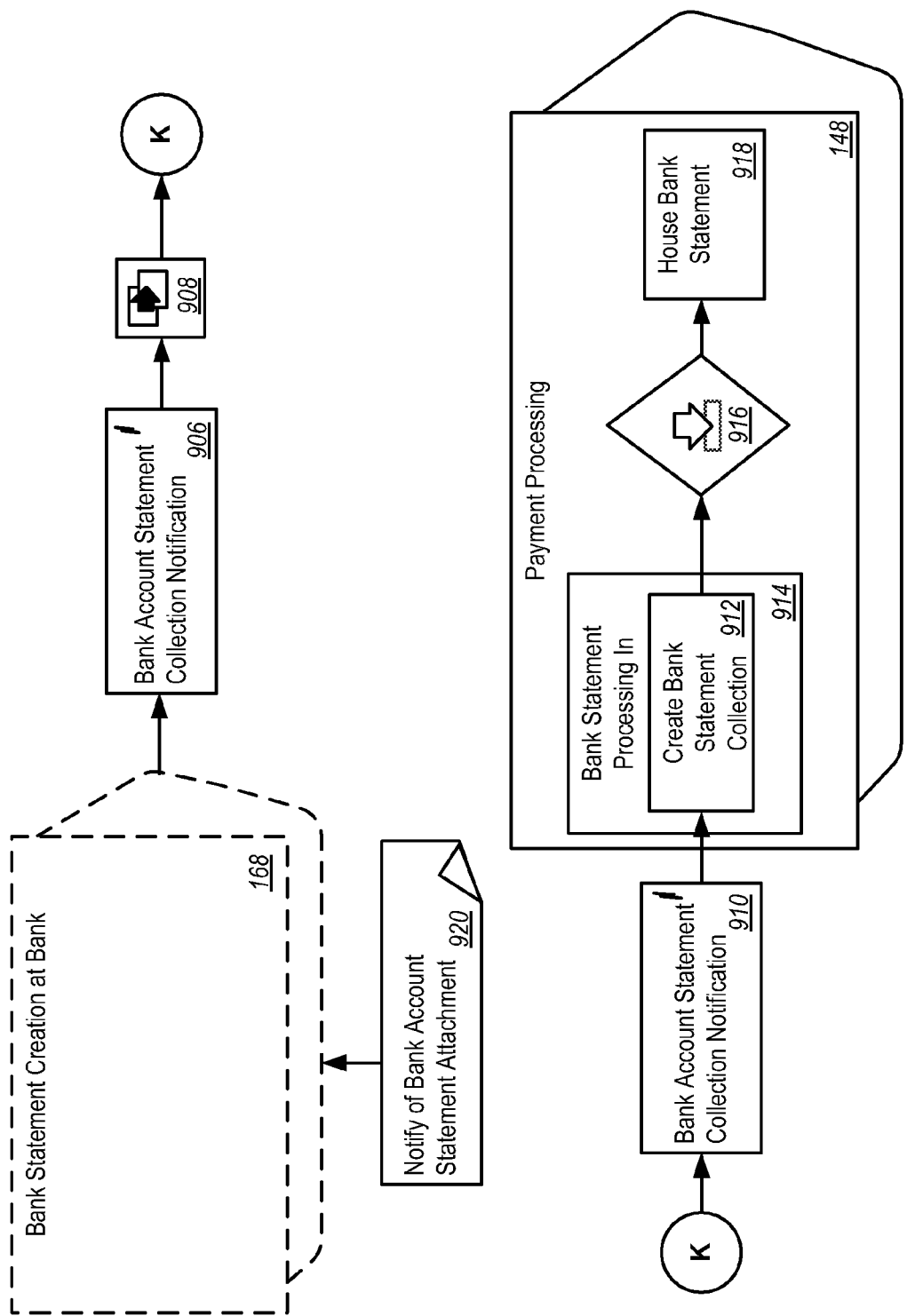
FIG. 9 is a block diagram showing interactions between a Bank Statement Creation at Bank process component and the Payment Processing process component.

FIG. 9 is a block diagram showing interactions between the Bank Statement Creation at Bank process component 168 and the Payment Processing process component 148 in the architectural design of FIG. 1. The interactions include notification to the Payment Processing process component 148 about one or more transactions on a bank account. In some implementations, the Bank Statement Creation at Bank process component 168 receives information from the Payment Processing process component 148 using a Notify of Bank Account Statement Attachment communication channel template 920. The communication channel template 920 can define protocols and parameters used for communication with an external party.

As shown in FIG. 9, a Bank Account Statement Collection Notification message 906 is generated by the Bank Statement Creation at Bank process component 168. The Bank Account Statement Collection Notification message 906 can be processed by a Mapping Entity 908 which generates a Bank Account Statement Collection Notification message 910. For example, the message 906 can be reformatted by the entity 908. In the present example, the messages 906 and 910 can have related information in different formats.

A Create Bank Statement Collection operation 912 receives the Bank Account Statement Collection Notification message 910. The operation 912 is included in a Bank Statement Processing In interface 914. The operation 912 creates a collection of bank statements in the Payment Processing process component 148. The Create Bank Statement Collection operation 912 uses a Maintain Bank Statement inbound process agent 916 to update a House Bank Statement business object 918. The House Bank Statement business object 918 represents a legally binding notification from a house bank about the transactions within a time period at a house bank account with a defined starting and closing balance.

Interactions between Process Components "Due Item Processing" and "Customer Invoice Processing"

Figure 10:
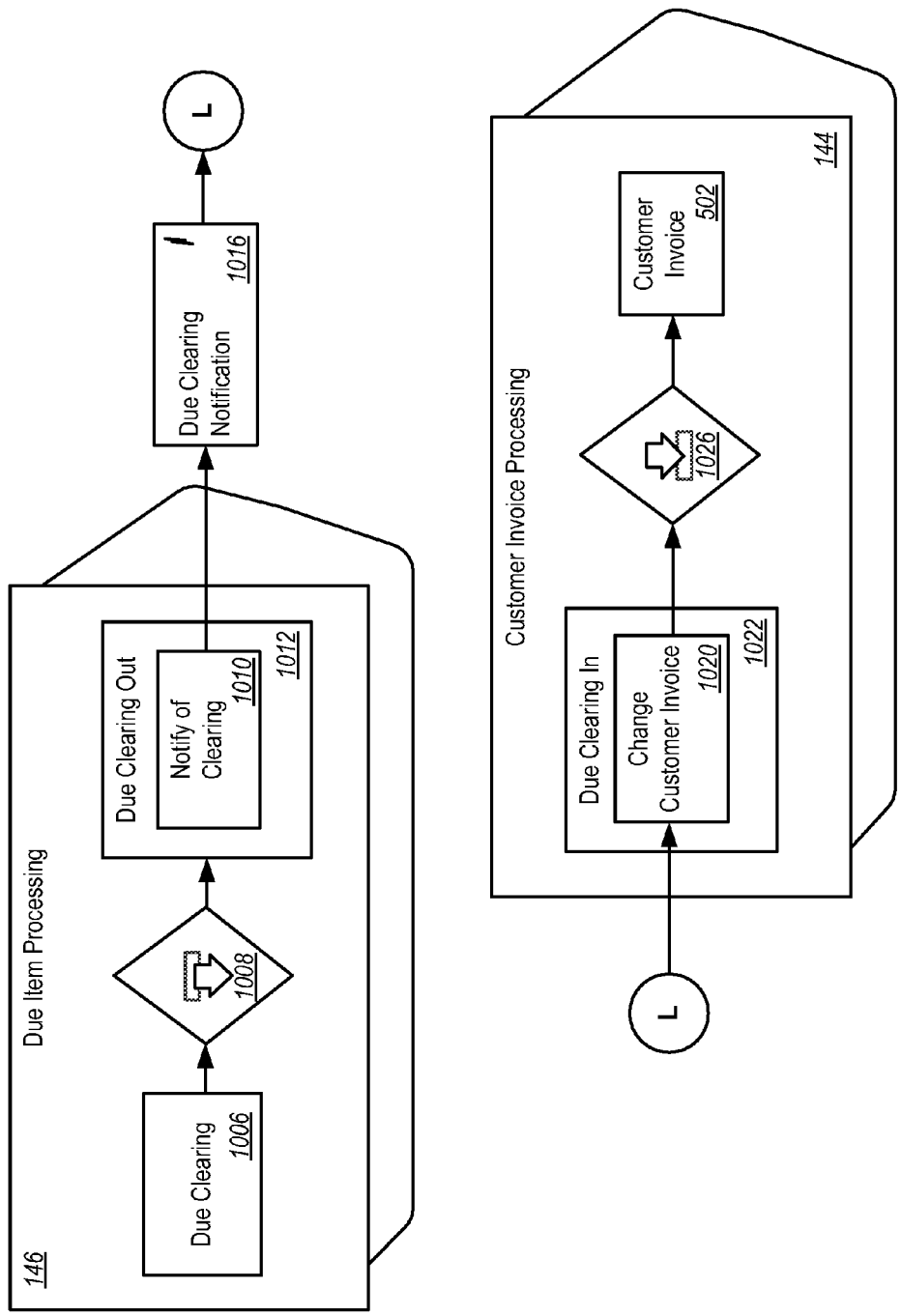
FIG. 10 is a block diagram showing interactions between the Due Item Processing process component and the Customer Invoice Processing process component.

FIG. 10 is a block diagram showing interactions between the Due Item Processing process component 146 and the Customer Invoice Processing process component 144 in the architectural design of FIG. 1. The interactions include a notification concerning a creation of a due clearing.

As shown in FIG. 10, the Due Item Processing process component 146 includes a Due Clearing business object 1006. The Due Clearing business object 1006 represents a group of receivables and payables for clearing.

The Due Clearing business object 1006 uses a Notify of Clearing to Customer Invoice Processing outbound process agent 1008 to invoke a Notify of Clearing operation 1010. The operation 1010 is included in a Due Clearing Out interface

1012. The operation 1010 notifies the Customer Invoice Processing process component 144 about clearing of trade receivables. The operation 1010 generates a Due Clearing Notification message 1016.

A Change Customer Invoice operation 1020 receives the Due Clearing Notification message 1016. The operation 1020 is included in a Due Clearing In interface 1022. The operation 1020 changes a customer invoice based on due clearing. The operation 1020 uses a Maintain Customer Invoice Based on Clearing inbound process agent 1026 to update the Customer Invoice business object 502. The Customer Invoice business object 502 represents a binding statement of amounts receivable resulting, for example, from deliveries to a customer, services performed for a customer, adjustments to these receivables, or credit memos to a customer.

Interactions between Process Components "Customer Invoice Processing" and "Balance of Foreign Payment Management"

Figure 11:
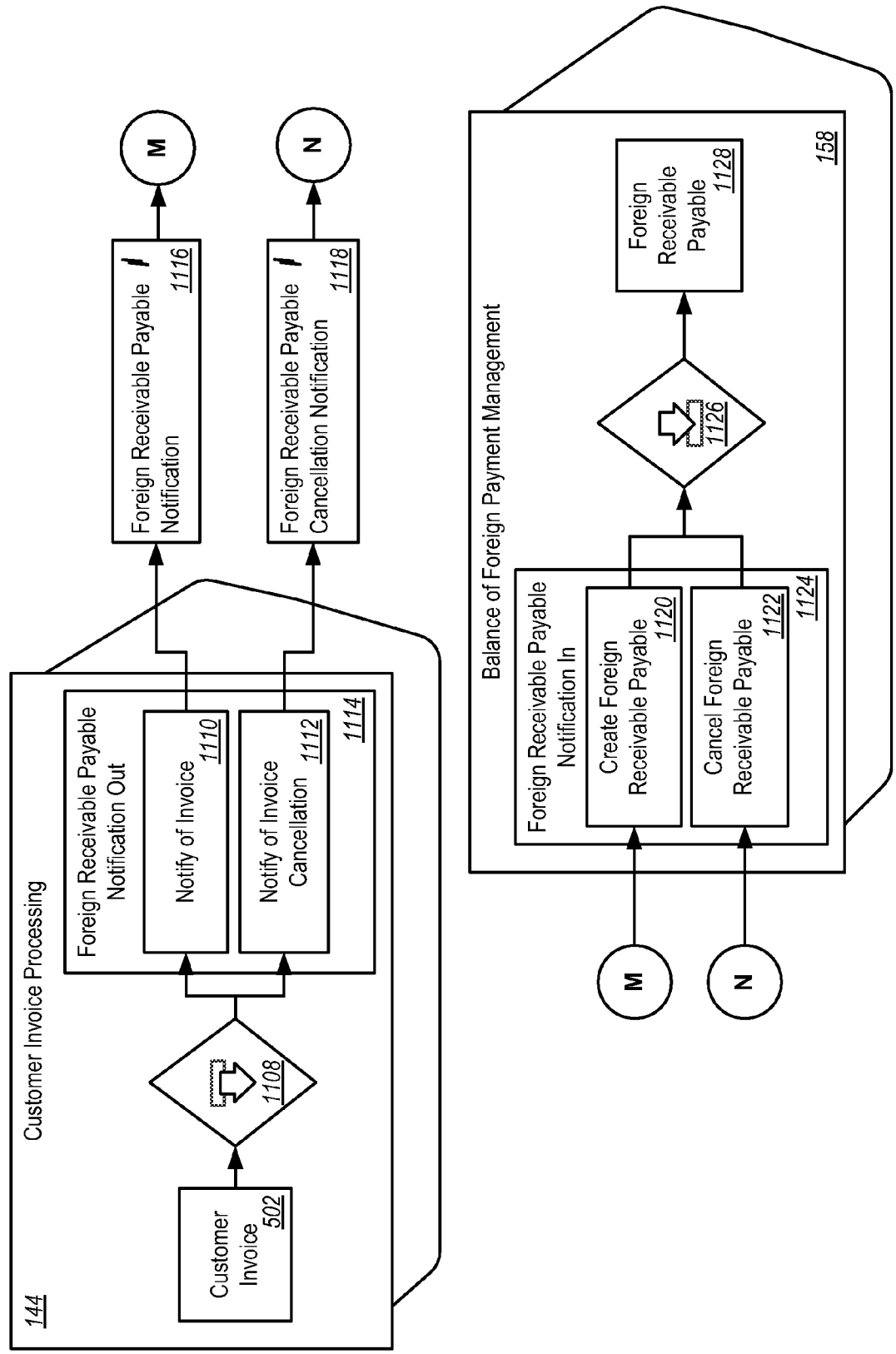
FIG. 11 is a block diagram showing interactions between the Customer Invoice Processing process component and a Balance of Foreign Payment Management process component.

FIG. 11 is a block diagram showing interactions between a Customer Invoice Processing process component 144 and a Balance of Foreign Payment Management process component 158. The Customer Invoice Processing process component 144 can notify the Balance of Foreign Payments Management process component 158 about a creation or cancellation of a receivable or customer invoice related to a non-resident buyer.

As shown in FIG. 11, the Customer Invoice Processing process component 144 includes a Customer Invoice business object 502 that represents a binding statement of amounts receivable resulting, for example, from deliveries to a customer, services performed for a customer, adjustments to these receivables, or credit memos to a customer. The Customer Invoice business object 502 uses a Notify of Customer Invoice to Balance of Foreign Payments Management outbound process agent 1108 to invoke a Notify of Invoice operation 1110. The operation 1110 notifies the Balance of Foreign Payment Management process component 158 about an invoice in order to track a receivable from or a payable to a non-resident business partner. Alternatively, the Customer Invoice business object 502 uses the Notify of Customer Invoice to Balance of Foreign Payments management outbound process agent 1108 to invoke a Notify of Invoice Cancellation operation 1112 to notify the Balance of Foreign Payment Management process component 158 about the cancellation of a previously posted supplier invoice.

The operations 1110 and 1112 are included in a Foreign Receivable Payable Notification Out interface 1114. The Notify of Invoice operation 1110 sends a Foreign Receivable Payable Notification message 1116 to the Balance of Foreign Payment Management process component 158. The Notify of Invoice Cancellation operation 1112 sends a Foreign Receivable Payable Cancellation Notification message 1118 to the Balance of Foreign Payment Management process component 158.

The Foreign Receivable Payable Notification message 1116 is received by a Create Foreign Receivable Payable operation 1120. The operation 1120 can create a receivable or payable from foreign trade. The Foreign Receivable Payable Cancellation Notification message 1118 is received by a Cancel Foreign Receivable Payable operation 1122. The operation 1122 provides a notification about the cancellation of a receivable or customer invoice related to a non-resident buyer. The operations 1116 and 1118 are included in a Foreign Receivable Payable Notification In interface 1124. The operations 1120 and 1122 use a Maintain Foreign Receivable Payable inbound process agent 1126 to create, change, or cancel a foreign receivable or payable in a Foreign Receivable Payable business object 1128. The Foreign Receivable Payable business object 1128 represents a receivable from or a payable to a non-resident business partner.

Interactions between Process Components "Payment Processing at Business Partner" and "Payment Processing"

Figure 12:
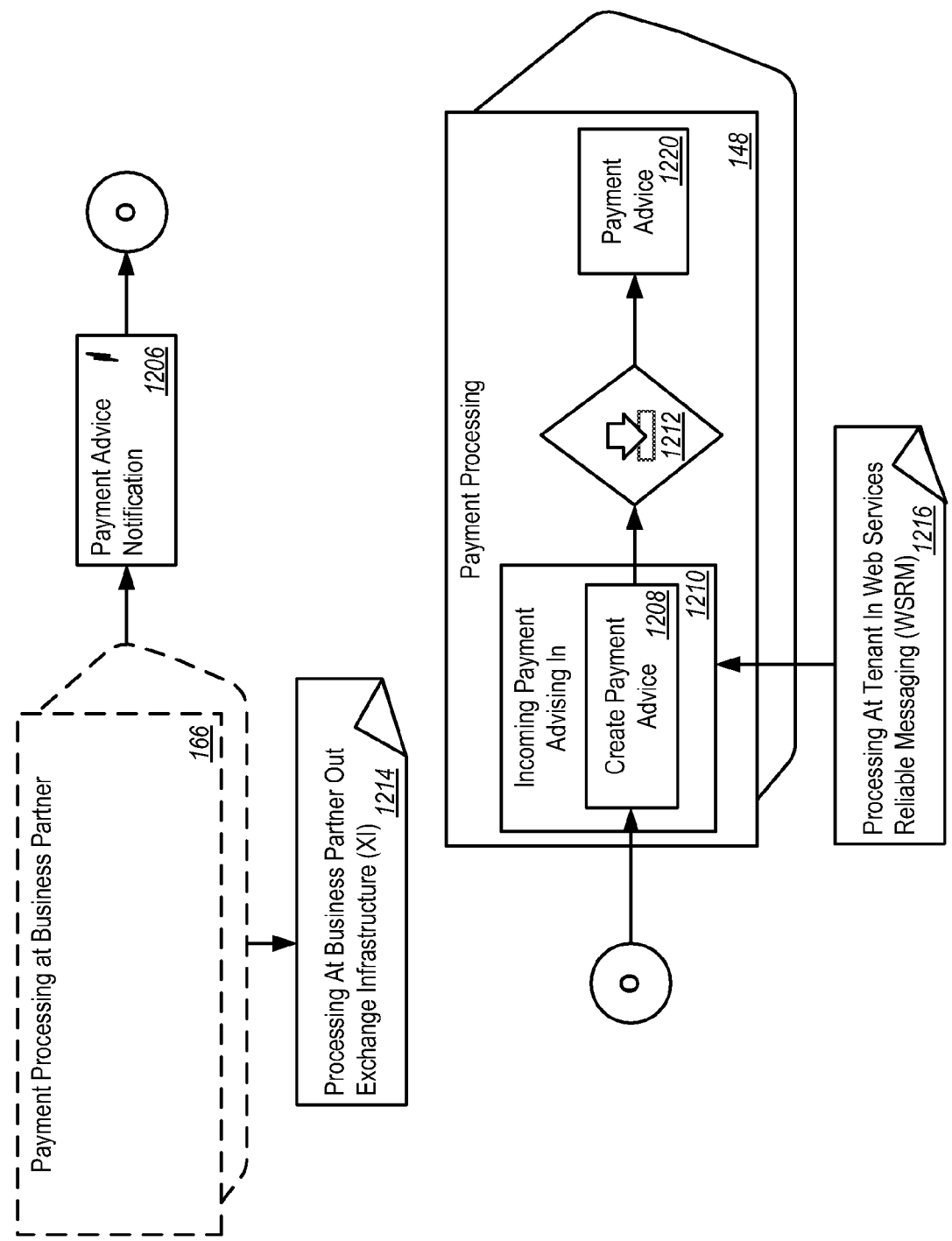
FIG. 12 is a block diagram showing interactions between a Payment Processing at Business Partner process component and the Payment Processing process component.

FIG. 12 is a block diagram showing interactions between the Payment Processing at Business Partner process component 166 and the Payment Processing process component 148 in the architectural design of FIG. 1. The interaction includes the receiving of payment advice from a business partner.

The Payment Processing at Business Partner process component 166 generates a Payment Advice Notification message 1206. The message 1206 can provide a notification of a payment with explanations about the reason for payment. In some implementations, the Payment Processing at Business Partner process component 166 sends information to the Payment Processing process component 148 using a Processing At Business Partner Out Exchange Infrastructure (XI) communication template 1214. The communication channel template 1214 can define protocols and parameters used for communication with an external party.

A Create Payment Advice operation 1208 receives the Payment Advice Notification message 1206. The operation 1208 is included in an Incoming Payment Advising In interface 1210. The operation 1208 creates a payment advice sent from a business partner or house bank concerning future payment transactions. The Create Payment Advice operation 1208 uses a Maintain Payment Advice inbound process agent 1212 to update a Payment Advice business object 1220. The Payment Advice business object 1220 represents an announcement of a payment transaction by a business partner to the company specifying payment reasons.

The Payment Processing process component 148 sends information to or receives information from the Payment Processing at Business Partner process component 166 using a Processing At Tenant In Web Services Reliable Messaging (WSRM) communication channel template 1216. The communication channel template 1216 can define protocols and parameters used for communication with an external party.

Interactions between Process Components "Payment Processing" and "Payment Processing at Business Partner"

Figure 13:
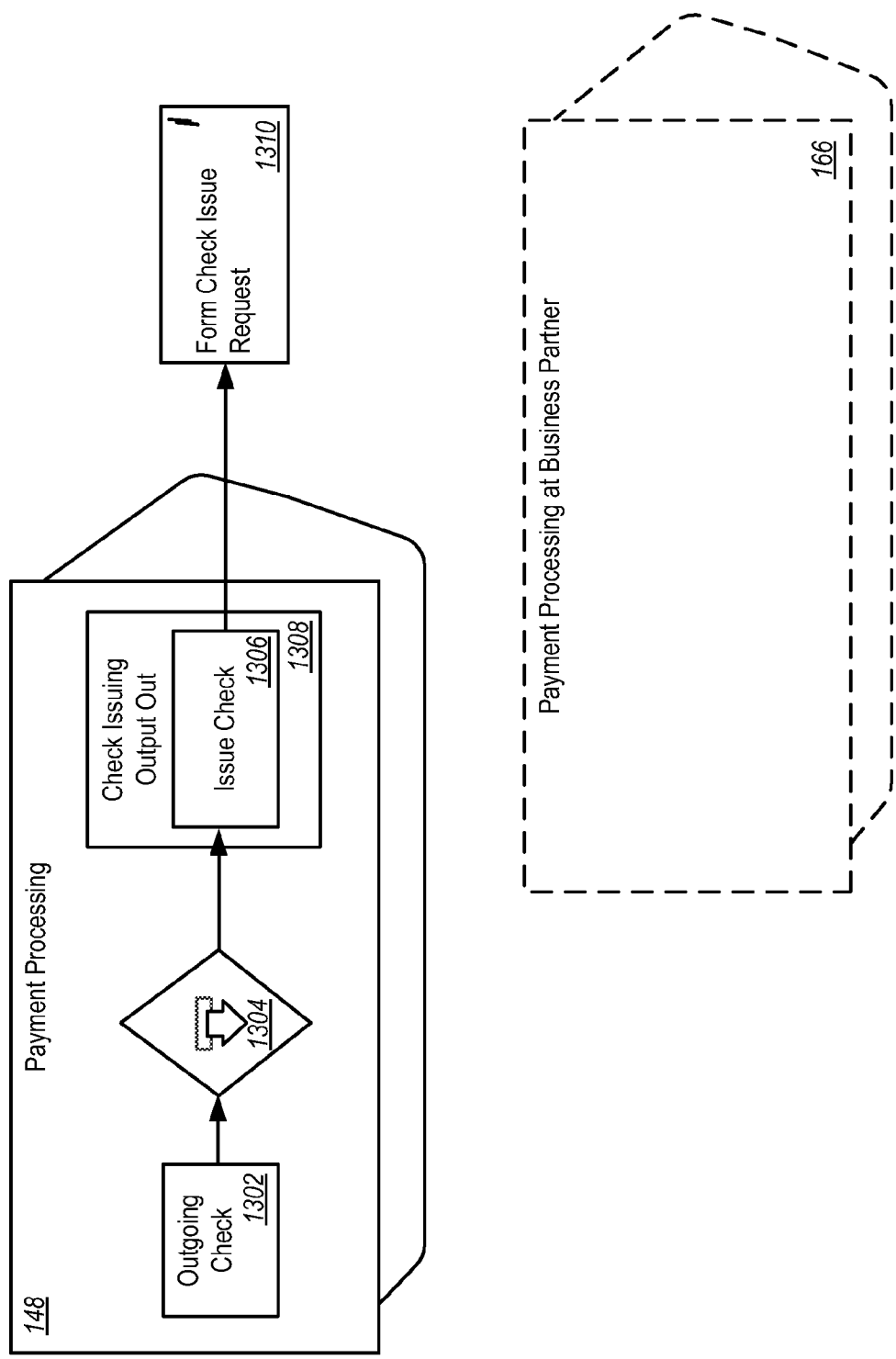
FIG. 13 is a block diagram showing interactions between the Payment Processing process component and the Payment Processing at Business Partner process component.

FIG. 13 is a block diagram showing interactions between the Payment Processing process component 148 and the Payment Processing at Business Partner process component 166 in the architectural design of FIG. 1. The interactions include the transferring of a printed outgoing check that is sent to a business partner.

As shown in FIG. 13, the Payment Processing process component 148 includes an Outgoing Check business object 1302. The Outgoing Check business object 1302 represents a check issued by a company payable to a business partner to fulfill a payment order. The Outgoing Check business object 1302 uses an Issue Check From Outgoing Check to Business Partner outbound process agent 1304 to invoke an Issue Check operation 1306 in a Check Issuing Output Out interface 1308. For example, the operation 1306 requests the issuing of a check by creating a print form. In this example, the Issue Check operation 1306 sends a Form Check Issue Request message 1310 to the Payment Processing at Business Partner process component 166.

Interactions between Process Components "Payment Processing" and "Payment Processing at Business Partner"

Figure 14:
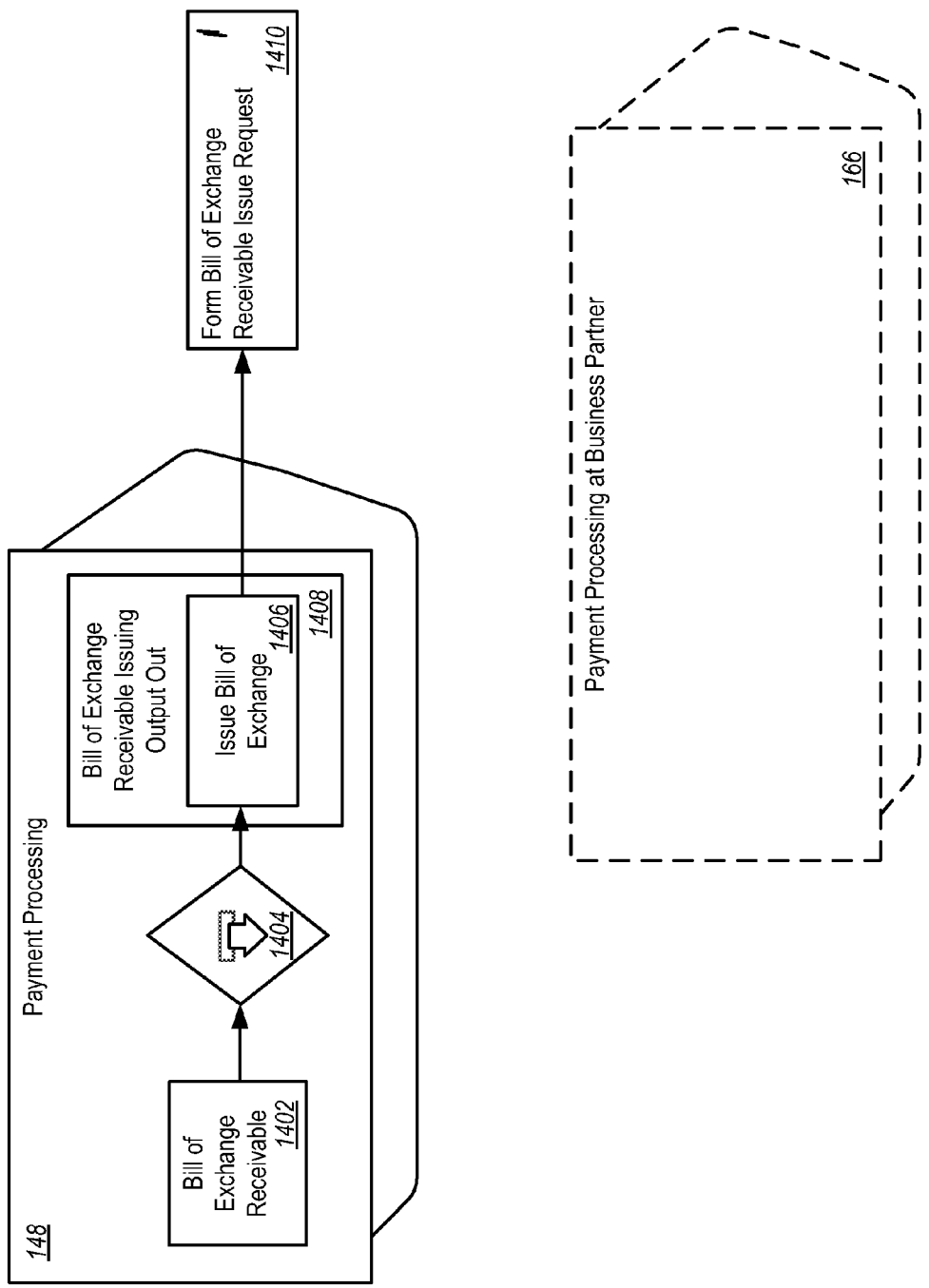
FIG. 14 is a block diagram showing further interactions between the Payment Processing process component and the Payment Processing at Business Partner process component.

FIG. 14 is a block diagram showing further interactions between the Payment Processing process component 148 and the Payment Processing at Business Partner process component 166 in the architectural design of FIG. 1. The interactions include the transferring of a printed bill of exchange receivable that is sent to a business partner.

As shown in FIG. 14, the Payment Processing process component 148 includes a Bill of Exchange Receivable business object 1402. The Bill of Exchange Receivable business object 1402 represents a bill of exchange issued by the company or by a business partner for the benefit of the company. The Bill of Exchange Receivable business object 1402 uses an Issue Bill Of Exchange Receivable to Business Partner outbound process agent 1404 to invoke an Issue Bill of Exchange operation 1406 in a Bill of Exchange Receivable Issuing Output Out interface 1408. For example, the operation 1406 requests the issuing of a bill of exchange. The Issue Bill of Exchange operation 1406 sends a Form Bill of Exchange Receivable Issue Request message 1410 to the Payment Processing at Business Partner process component 166.

Interactions between Process Components "Pricing Engine" and "External Tax Calculation"

Figure 15:
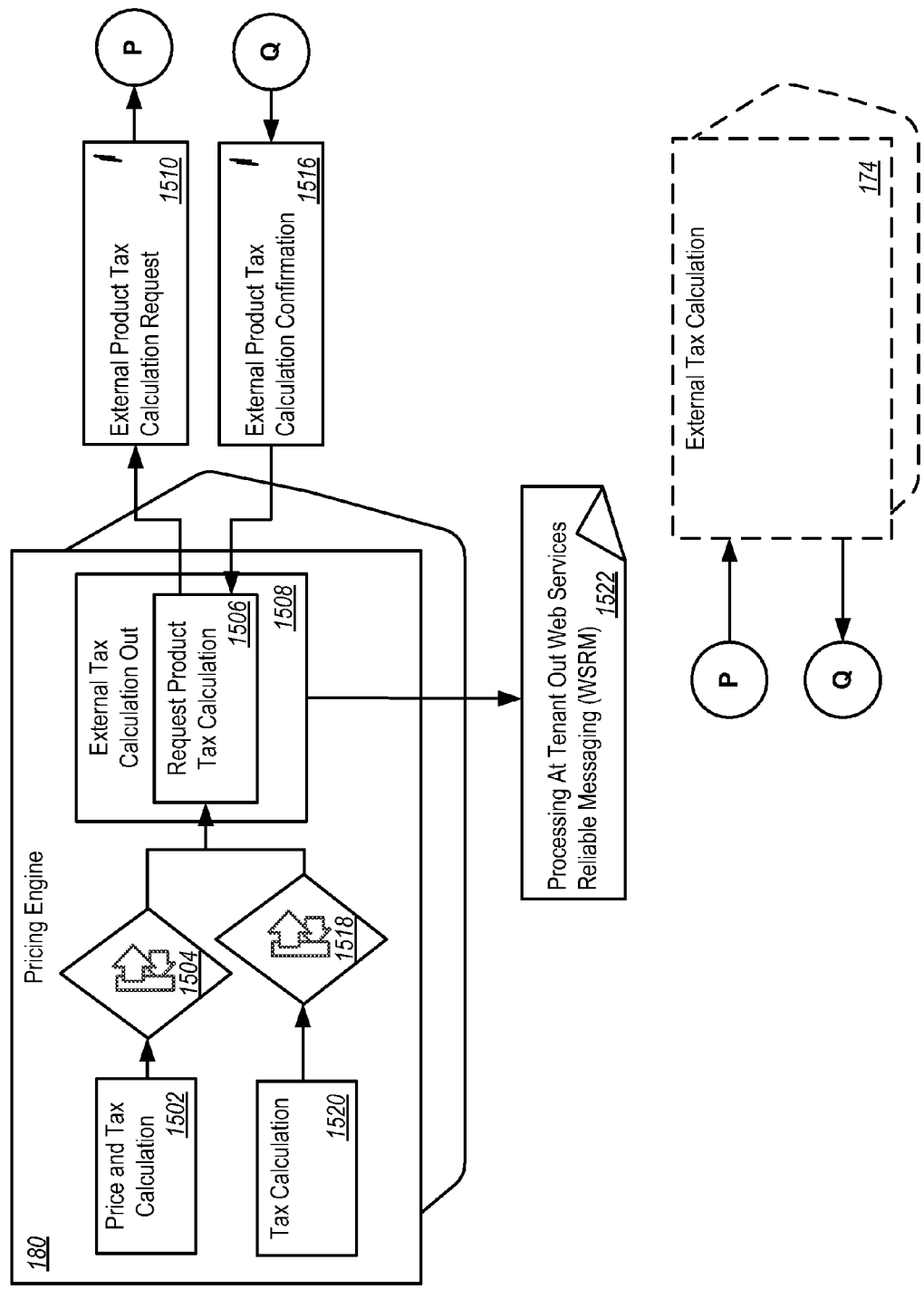
FIG. 15 is a block diagram showing interactions between a Pricing Engine process component and an External Tax Calculation process component.

FIG. 15 is a block diagram showing interactions between the Pricing Engine process component 180 and the External Tax Calculation process component 174 in the architectural design of FIG. 1. The interactions include requesting of a tax calculation from the External Tax Calculation process component 174.

As shown in FIG. 15, the Pricing Engine process component 180 includes a Price and Tax Calculation business object 1502 and a Tax Calculation business object 1520. The Price and Tax Calculation business object 1502 represents a summary of the determined price and tax components for a business case. The Tax Calculation business object 1520 represents a summarization of the determined and calculated tax elements of a business case. The Price and Tax Calculation business object 1502 uses a Sync Request Product Tax Calculation from Price and Tax Calculation to External Tax Calculation synchronous outbound process agent 1504 to invoke a Request Product Tax Calculation operation 1506. The Tax Calculation business object 1520 uses a Sync Request Product Tax Calculation from Tax Calculation to External Tax Calculation synchronous outbound process agent 1518 to invoke the Request Product Tax Calculation operation 1506. The Request Product Tax Calculation operation 1506 is included in an External Tax Calculation Out interface 1508.

The Request Product Tax Calculation operation 1506 requests product tax calculation from an external tax calculation system. For example, the Request Product Tax Calculation operation 1506 sends an External Product Tax Calculation Request message 1510 to the External Tax Calculation process component 174. The Request Product Tax Calculation operation 1506 receives an External Product Tax Calculation Confirmation message 1516 from the External Tax Calculation process component 174 indicating a confirmation that the product tax is calculated properly and/or a result of the calculation.

The Pricing Engine process component 180 receives information from a Processing At Tenant Out Web Services Reliable Messaging (WSRM) process component 1522. The External Tax Calculation Out interface 1508 sends information to the Processing External Tax Calculation process component 174 using the Processing At Tenant Out Web Services Reliable Messaging (WSRM) communication channel template 1522. The communication channel template 1522 can define protocols and parameters used for communication with an external party.

Interactions between Process Components "Payment Processing" and "Payment Order Processing at House Bank"

Figure 16:
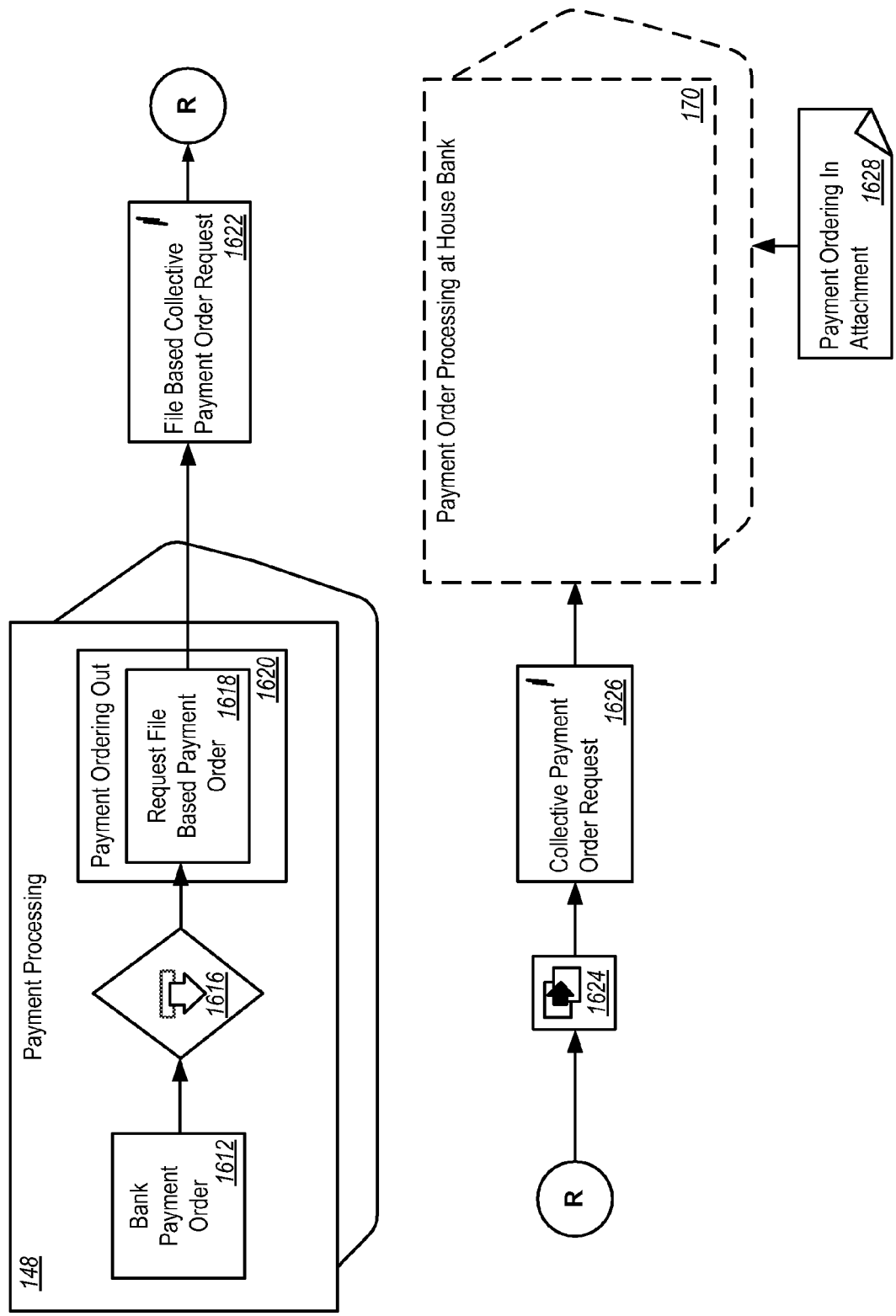
FIG. 16 is a block diagram showing interactions between the Payment Processing process component and a Payment Order Processing at House Bank process component.

FIG. 16 is a block diagram showing interactions between the Payment Processing process component 148 and the Payment Order Processing at House Bank process component 170 in the architectural design of FIG. 1. The interactions include requesting of execution of bank transfers. The communication can be direct or based on file exchange, for example.

As shown in FIG. 16, the Payment Processing process component 148 includes a Bank Payment Order business object 1612. The Bank Payment Order business object 1612 represents an order to a house bank to make a transfer or direct debit from a specified house bank account to fulfill a payment order.

The Bank Payment Order business object 1612 uses a Request File Based Payment Order from Bank Payment Order to House Bank outbound process agent 1616 to invoke a Request File Based Payment Order operation 1618. The Request File based Payment Order operation 1618 instructs a house bank, using a file, to make a bank transfer, direct debit, outgoing check, or bill of exchange payable. The operation 1618 is included in a Payment Ordering Out interface 1620.

The Request File Based Payment Order operation 1618 generates a File Based Collective Payment Order Request message 1622. The File Based Collective Payment Order Request message 1622 uses a Mapping Entity 1624 to transform the file-based message type to a Collective Payment Order Request message 1626 that can be received by the Payment Order Processing at House Bank process component 170. The Collective Payment Order Request message 1626 is in a format that a house bank can understand. A collective payment order can be an instruction based on a file transfer to a credit institution to carry out one or more payment transactions (e.g., bank transfers or direct debits).

The Payment Order Processing at House Bank process component 170 receives information from the Payment Processing process component 148 using a Payment Ordering In Attachment communication channel template 1628. The communication channel template 1628 can define protocols and parameters used for communication with an external party.

Interactions between Process Components "Customer Invoice Processing" and "Supplier Invoice Processing at Customer"

Figure 17:
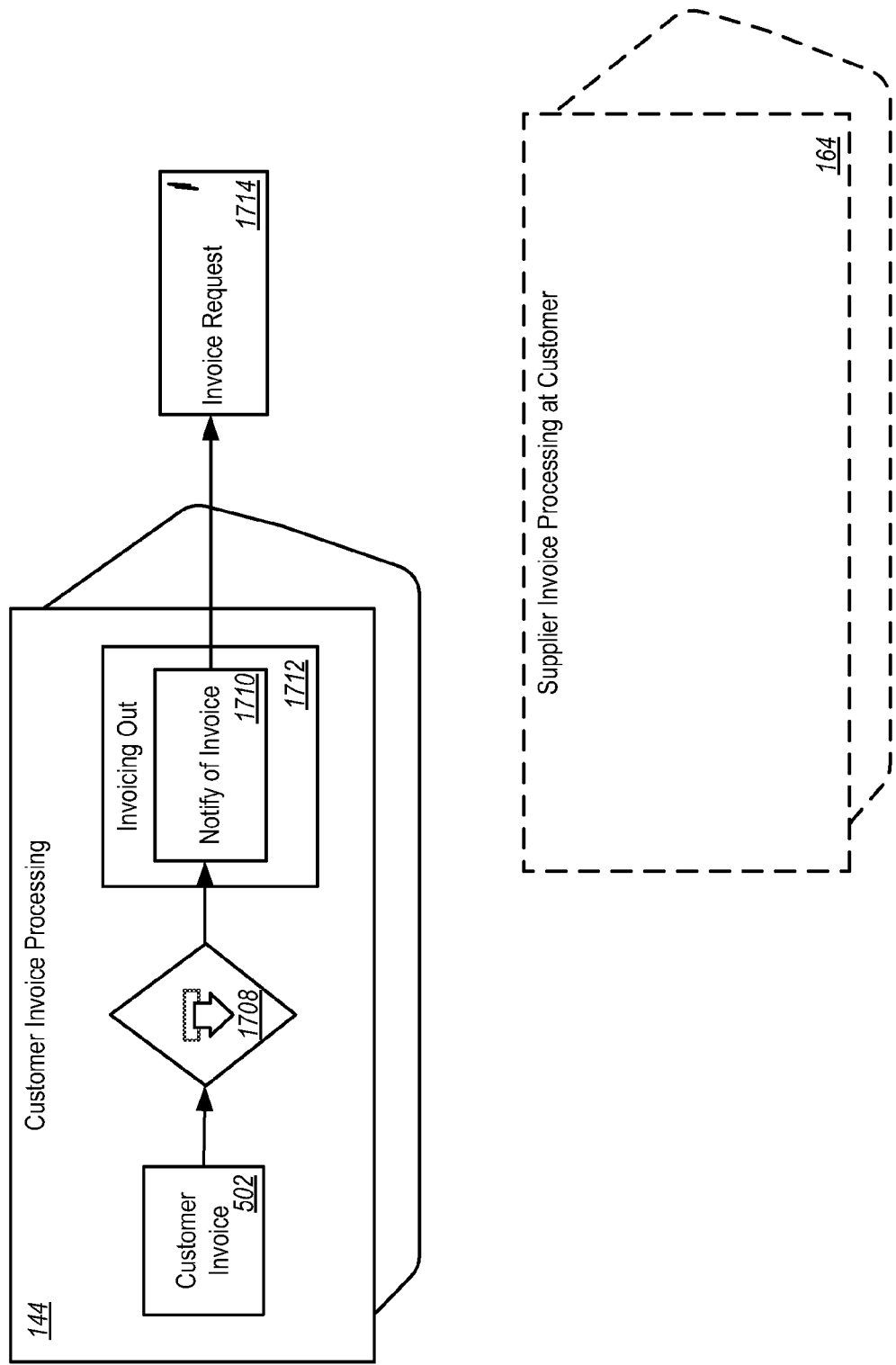
FIG. 17 is a block diagram showing interactions between the Customer Invoice Processing process component and a Supplier Invoice Processing at Customer process component.

FIG. 17 is a block diagram showing interactions between the Customer Invoice Processing process component 144 and the Supplier Invoice Processing at Customer process component 164 in the architectural design of FIG. 1. The interactions include the notification of supplier invoice processing about the creation of a customer invoice.

As shown in FIG. 17, the Customer Invoice Processing process component 144 includes the Customer Invoice business object 502. The Customer Invoice business object 502 represents a binding statement of amounts receivable resulting, for example, from deliveries to a customer, services performed for a customer, adjustments to these receivables, or credit memos to a customer. The Customer Invoice business object 502 uses a Notify Customer of Customer Invoice outbound process agent 1708 to invoke a Notify of Invoice operation 1710 in an Invoicing Out interface 1712. For example, the operation 1710 informs the recipient of the customer invoice about invoicing. The Notify of Invoice operation 1710 sends an Invoice Request message 1714 to the Supplier Invoice Processing at Customer process component 164.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the software architecture design or of what may be claimed, but rather as an exemplification of preferred embodiments of the software architecture design. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer program product comprising application software encoded on a non-transitory, tangible machine readable information carrier, the application software being structured as process components interacting with each other through service interfaces, the software comprising:
   a plurality of process components, each of the process components comprising a modular and application-independent package of reusable software implementing a respective and distinct business process, the business process comprising functionality exposed by the process component via at least one service interface, the plurality of process components including:
   a due item processing process component that collects, manages, and monitors trade receivables or payables and corresponding sales tax or withholding tax;
   a project processing process component that structures, plans, and executes simple, short-term measures and complex projects;
   a balance of foreign payment management process component that collects, processes, and reports receivables and payables according to foreign trade regulations to create a balance of payments of a country;

a payment processing process component that processes and manages payments and conducts communications with financial institutions;
a customer invoice processing process component that processes invoicing of customers for delivery of goods or provision of services; and
an accounting process component that processes business transactions for valuation and profitability analysis; and
a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, the passing of messages between an inbound and an outbound operation defining a message based pair wise interaction between the respective process components of the respective operations, the pair-wise interactions between pairs of the process components including interactions between:
the due item processing process component and a due item processing at business partner process component;
an accounting coding block distribution processing process component and the project processing process component, where the pair-wise interaction between the accounting coding block distribution processing process component and the project processing process component includes the transmission of:
an accounting object check request message from the accounting coding block distribution processing process component to the project processing process component the accounting object check request message requesting a status check for tasks associated with the existence and availability for expense or resource assignment in accounting; and
an accounting object check confirmation message from the project processing process component to the accounting coding block distribution processing process component the accounting object check confirmation message providing a confirmation of the existence of at least one accounting object and whether the at least one accounting object is permitted for assignment in accounting;
the payment processing process component and the due item processing process component, where the pair-wise interaction between the payment processing process component and the due item processing process component includes the transmission of:
a clearing request message from the payment processing process component to the due item processing process component, the clearing request message requesting the clearing of payments within the due item processing process component;
a clearing cancellation request message from the payment processing process component to the due item processing process component, the clearing cancellation request message requesting cancellation of a previously sent clearing request; and
a clearing confirmation message from the due item processing process component to the payment processing process component, the clearing confirmation message providing a confirmation or rejection to the payment processing process component in response to a clearing request or clearing cancellation request message;
the customer invoice processing process component and the accounting process component, where the pair-wise interaction between the customer invoice processing process component and the accounting process component includes the transmission of:
an invoice accounting notification message from the customer invoice processing process component to the accounting process component, the invoice accounting notification message requesting the accounting process component to create an accounting document based on invoice data received from the customer invoice processing process component;
an invoice cancellation accounting notification message from the customer invoice processing process component to the accounting process component, the invoice cancellation accounting notification message requesting the accounting process component to cancel an existing accounting document based on cancellation data received from the customer invoice processing process component; and
a sales and purchasing accounting notification message from the customer invoice processing process component to the accounting process component, the sales and purchasing accounting notification message notifying the accounting process component about the creation, change, or cancellation of a customer invoice request;
a bank statement creation at bank process component and the payment processing process component;
the due item processing process component and the customer invoice processing process component, where the pair-wise interaction between the due item processing process component and the customer invoice processing process component includes the transmission of:
a due clearing notification message from the due item processing process component to the customer invoice processing process component, the due clearing notification message notifying the customer invoice processing process component about clearing of trade receivables at the due item processing process component;
the customer invoice processing process component and the balance of foreign payment management process component, where the pair-wise interaction between the customer invoice processing process component and the balance of foreign payment management process component includes the transmission of:
a foreign receivable payable notification message from the customer invoice processing process component and the balance of foreign payment management process component, the foreign receivable payable notification message notifying the balance of foreign payment management process component about an invoice in order to track a receivable from or a payable to a non-resident business partner; and
a foreign receivable payable cancellation notification message from the customer invoice processing process component and the balance of foreign payment management process component, the foreign receivable payable cancellation notification message notifying the balance of foreign payment management process component about the cancellation of a previously posted supplier invoice;
the payment processing process component and a payment processing at business partner process component;
the payment processing process component and a payment order processing at house bank process component; and
the customer invoice processing process component and a supplier invoice processing at customer process component.

2. The computer program product of claim 1, wherein:
each of the plurality of process components is assigned to no more than one deployment unit among multiple deployment units, and each deployment unit is deployable on a separate computer hardware platform independent of every other deployment unit; and
all interaction between a process component in one deployment unit and any other process component in any other deployment unit takes place through the respective service interfaces of the two process components.

3. The computer program product of claim 2, wherein the deployment units comprise:
a financials deployment that includes the accounting process component, the due item processing process component, the payment processing process component, and the balance of foreign payment management process component;
a project management deployment unit that includes the project processing component; and a customer invoicing deployment unit that includes the customer invoice processing process component.

4. The computer program product of claim 1, wherein:
each of the process components includes at least one business object; and
none of the business objects of any one of the process components interacts directly with any of the business objects included in any of the other process components.

5. The computer program product of claim 2, wherein the business objects comprise a business process object.

6. The computer program product of claim 2, wherein none of the business objects included in any one of the process components is included in any of the other process components.

7. The computer program product of claim 1, further comprising a plurality of process agents, each process agent being either an inbound process agent or an outbound process agent, the inbound process agent being operable to receive a message from the inbound operation, the outbound process agent being operable to cause the outbound operation to send a message, and each process agent being associated with exactly one process component.

8. The computer program product of claim 5, wherein the inbound process agents comprise a first inbound process agent operable to start the execution of a step requested in a first inbound message by creating or updating at least one business object instance.

9. The computer program product of claim 5, wherein the outbound process agents comprise a first asynchronous outbound process agent that is called after a business object that is associated with the first outbound process agent changes.

10. The computer program product of claim 1, wherein the operations comprise synchronous and asynchronous operations.

11. A system, comprising:
a computer system comprising at least one hardware platform configured with a computer software application, the computer software application being structured as a plurality of process components interacting with each other through service interfaces;
each of the process components comprising a modular and application-independent package of reusable software implementing a respective and distinct business process, the business process comprising functionality exposed by the process component via at least one service interface, the plurality of process components including:
a due item processing process component that collects, manages, and monitors trade receivables or payables and corresponding sales tax or withholding tax;
a project processing process component that structures, plans, and executes simple, short-term measures and complex projects;
a balance of foreign payment management process component that collects, processes, and reports receivables and payables according to foreign trade regulations to create a balance of payments of a country;
a payment processing process component that processes and manages payments and conducts communications with financial institutions;
a customer invoice processing process component that processes invoicing of customers for delivery of goods or provision of services; and
an accounting process component that processes business transactions for valuation and profitability analysis; and
a plurality of service interfaces, each service interface associated with exactly one process component and comprising at least one operation, each operation being implemented exactly one process component, the operations comprising inbound and outbound operations, the outbound operation for a first process component being operable to send a message to a second process component of the plurality of process components, the second process component having an inbound operation for receiving the message, the passing of messages between an inbound and an outbound operation defining a message based pair wise interaction between the respective process components of the respective operations, the pair-wise interactions between pairs of the process components including interactions between:
the due item processing process component and a due item processing at business partner process component;
an accounting coding block distribution processing process component and the project processing process component, where the pair-wise interaction between the accounting coding block distribution processing process component and the project processing process component includes the transmission of:
an accounting object check request message from the accounting coding block distribution processing process component to the project processing process component, the accounting object check request message requesting a status check for tasks associated with the existence and availability for expense or resource assignment in accounting; and
an accounting object check confirmation message from the project processing process component to the accounting coding block distribution processing process component, the accounting object check confirmation message providing a confirmation of the existence of at least one accounting object and whether the at least one accounting object is permitted for assignment in accounting;

the payment processing process component and the due item processing process component, where the pair-wise interaction between the payment processing process component and the due item processing process component includes the transmission of:
- a clearing request message from the payment processing process component to the due item processing process component, the clearing request message requesting the clearing of payments within the due item processing process component;
- a clearing cancellation request message from the payment processing process component to the due item processing process component, the clearing cancellation request message requesting cancellation of a previously sent clearing request; and
- a clearing confirmation message from the due item processing process component to the payment processing process component, the clearing confirmation message providing a confirmation or rejection to the payment processing process component in response to a clearing request or clearing cancellation request message;

the customer invoice processing process component and the accounting process component, where the pair-wise interaction between the customer invoice processing process component and the accounting process component includes the transmission of:
- an invoice accounting notification message from the customer invoice processing process component to the accounting process component, the invoice accounting notification message requesting the accounting process component to create an accounting document based on invoice data received from the customer invoice processing process component;
- an invoice cancellation accounting notification message from the customer invoice processing process component to the accounting process component, the invoice cancellation accounting notification message requesting the accounting process component to cancel an existing accounting document based on cancellation data received from the customer invoice processing process component; and
- a sales and purchasing accounting notification message from the customer invoice processing process component to the accounting process component, the sales and purchasing accounting notification message notifying the accounting process component about the creation, change, or cancellation of a customer invoice request;

a bank statement creation at bank process component and the payment processing process component;

the due item processing process component and the customer invoice processing process component, where the pair-wise interaction between the due item processing process component and the customer invoice processing process component includes the transmission of:
- a due clearing notification message from the due item processing process component to the customer invoice processing process component, the due clearing notification message notifying the customer invoice processing process component about clearing of trade receivables at the due item processing process component;

the customer invoice processing process component and the balance of foreign payment management process component, where the pair-wise interaction between the customer invoice processing process component and the balance of foreign payment management process component includes the transmission of:
- a foreign receivable payable notification message from the customer invoice processing process component and the balance of foreign payment management process component, the foreign receivable payable notification message notifying the balance of foreign payment management process component about an invoice in order to track a receivable from or a payable to a non-resident business partner; and
- a foreign receivable payable cancellation notification message from the customer invoice processing process component and the balance of foreign payment management process component, the foreign receivable payable cancellation notification message notifying the balance of foreign payment management process component about the cancellation of a previously posted supplier invoice;

the payment processing process component and a payment processing at business partner process component;

the payment processing process component and a payment order processing at house bank process component; and the customer invoice processing process component and a supplier invoice processing at customer process component.

12. The system of claim 11, wherein:
each of the process components includes at least one business object; and
none of the business objects of any one of the process components interacts directly with any of the business objects included in any of the other process components.

13. The system of claim 11, wherein none of the business objects included in any one of the process components is included in any of the other process components.

14. The system of claim 11, wherein a plurality of process agents, each process agent being either an inbound process agent or an outbound process agent, the inbound process agent being operable to receive a message from the inbound operation, the outbound process agent being operable to cause the outbound operation to send a message, and each process agent being associated with exactly one process component.

15. The system of claim 11, the system comprising multiple hardware platforms, wherein:
the accounting process component, the due item processing process component, the payment processing process component, and the balance of foreign payment management process component are deployed on a first hardware platform;
the project processing process component is deployed on a second hardware platform; and
the customer invoice processing process component is deployed on a third hardware platform.

16. The system of claim 15, wherein each of the first through the third hardware platforms is distinct and separate from each other.

17. A computer-implemented method for developing a computer software application, the method comprising the following steps performed by at least one processor:
obtaining, in a programmable computer system having at least one processor, a storage medium, and an interface, digital data representing an architectural design for a set of processes implementing an end-to-end application process, the design specifying a process component for each process in the set of processes, each of the process components comprising a modular and application-independent package of reusable software implementing a respective and distinct process, the design further specifying a set of process component interactions based on messages transmitted between two or more process components, wherein
the specified process components include:
  a due item processing process component that collects, manages, and monitors trade receivables or payables and corresponding sales tax or withholding tax;
  a project processing process component that structures, plans, and executes simple, short-term measures and complex projects;
  a balance of foreign payment management process component that collects, processes, and reports receivables and payables according to foreign trade regulations to create a balance of payments of a country;
  a payment processing process component that processes and manages payments and conducts communications with financial institutions;
  a customer invoice processing process component that processes invoicing of customers for delivery of goods or provision of services; and
  an accounting process component that processes business transactions for valuation and profitability analysis; and
the process component interactions include interactions between:
  the due item processing process component and a due item processing at business partner process component;
  an accounting coding block distribution processing process component and the project processing process component, where the interaction between the accounting coding block distribution processing process component and the project processing process component includes the transmission of:
    an accounting object check request message from the accounting coding block distribution processing process component to the project processing process component the accounting object check request message requesting a status check for tasks associated with the existence and availability for expense or resource assignment in accounting; and
    an accounting object check confirmation message from the project processing process component to the accounting coding block distribution processing process component the accounting object check confirmation message providing a confirmation of the existence of at least one accounting object and whether the at least one accounting object is permitted for assignment in accounting;
  the payment processing process component and the due item processing process component where the interaction between the payment processing process component and the due item processing process component includes the transmission of:
    a clearing request message from the payment processing process component to the due item processing process component, the clearing request message requesting the clearing of payments within the due item processing process component;
    a clearing cancellation request message from the payment processing process component to the due item processing process component, the clearing cancellation request message requesting cancellation of a previously sent clearing request; and
    a clearing confirmation message from the due item processing process component to the payment processing process component, the clearing confirmation message providing a confirmation or rejection to the payment processing process component in response to a clearing request or clearing cancellation request message;
  the customer invoice processing process component and the accounting process component, where the interaction between the customer invoice processing process component and the accounting process component includes the transmission of:
    an invoice accounting notification message from the customer invoice processing process component to the accounting process component the invoice accounting notification message requesting the accounting process component to create an accounting document based on invoice data received from the customer invoice processing process component;
    an invoice cancellation accounting notification message from the customer invoice processing process component to the accounting process component the invoice cancellation accounting notification message requesting the accounting process component to cancel an existing accounting document based on cancellation data received from the customer invoice processing process component; and
    a sales and purchasing accounting notification message from the customer invoice processing process component to the accounting process component the sales and purchasing accounting notification message notifying the accounting process component about the creation change or cancellation of a customer invoice request;
  a bank statement creation at bank process component and the payment processing process component;
  the due item processing process component and the customer invoice processing process component, where the interaction between the due item processing process component and the customer invoice processing process component includes the transmission of:
    a due clearing notification message from the due item processing process component to the customer invoice processing process component the due clearing notification message notifying the customer invoice processing process component about clearing of trade receivables at the due item processing process component;
  the customer invoice processing process component and the balance of foreign payment management process component, where the interaction between the customer invoice processing process component and the balance of foreign payment management process component includes the transmission of:
    a foreign receivable payable notification message from the customer invoice processing process component and the balance of foreign payment management process component the foreign receivable payable notification message notifying the balance of foreign payment management process component about an invoice in order to track a receivable from or a payable to a non-resident business partner; and a foreign receivable payable cancellation notification message from the customer invoice processing process component and the balance of foreign payment management process component the foreign receivable payable cancellation notification message notifying the balance of foreign payment management process component about the cancellation of a previously posted supplier invoice;

the payment processing process component and a payment processing at business partner process component;

the payment processing process component and a payment order processing at house bank process component; and the customer invoice processing process component and a supplier invoice processing at customer process component; and generating, using the at least one processor on the computer system, a computer software application to perform the set of processes based on the obtained design including the specified process components and specified process component interactions.

18. The method of claim 17, wherein each process in the set of processes is a business process transforming a defined business input into a defined business outcome.

19. The method of claim 17, wherein obtaining digital data representing the architectural design further comprises editing the design before generating the computer software application.

\* \* \* \* \*